(12) United States Patent
Balmer et al.

(10) Patent No.: US 6,829,696 B1
(45) Date of Patent: Dec. 7, 2004

(54) DATA PROCESSING SYSTEM WITH REGISTER STORE/LOAD UTILIZING DATA PACKING/UNPACKING

(75) Inventors: Keith Balmer, Bedford (GB); Karl M. Guttag, Dallas, TX (US); Lewis Nardini, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 636 days.

(21) Appl. No.: 09/687,540

(22) Filed: Oct. 13, 2000

Related U.S. Application Data

(60) Provisional application No. 60/173,761, filed on Dec. 30, 1999.

(51) Int. Cl.[7] .............................................. G06F 9/312
(52) U.S. Cl. .......................... 712/4; 712/222; 712/223; 712/225
(58) Field of Search ........................... 712/4, 222, 223, 712/225

(56) References Cited

U.S. PATENT DOCUMENTS 5,909,572 A * 6/1999 Thayer et al. .............. 712/226
6,119,216 A * 9/2000 Peleg et al. ................. 712/22

FOREIGN PATENT DOCUMENTS

WO        WO 99/14663        * 3/1999     ............. G06F/9/30

* cited by examiner

Primary Examiner—William M. Treat
(74) Attorney, Agent, or Firm—Robert D. Marshall, Jr.; W. James Brady, III; Frederick J. Telecky, Jr.

(57) ABSTRACT

A data processing system (e.g., microprocessor 30) for packing register data while storing it to memory and unpacking data read from memory while loading it into registers using single processor instructions. The system comprises a memory (42) and a central processing unit core (44) with at least one register file (76). The core is responsive to a load instruction (e.g., LDW_BH[U] instruction 184) to retrieve at least one data word from memory and parse the data word over selected parts of at least two data registers in the register file. The core is responsive to a store instruction (e.g., STBH_W instruction 198) to concatenate data from selected parts of at least two data registers into at least one data word and save the data word to memory. The number of data registers is greater than the number of data words parsed into or concatenated from the data registers. Both memory storage space and central processor unit resources are utilized efficiently when working with packed data. A single store or load instruction can perform all of the tasks that used to take several instructions, while at the same time conserving memory space.

39 Claims, 17 Drawing Sheets

| Mnemonic | Action | Operation | | | | |
|---|---|---|---|---|---|---|
| STBH_W 198 | Pack the LS byte of each halfword into a word | B/0 XXhgXXfe | A/E XXdcXXba | → | Memory hgfedcba | |
| STBHI_W 200 | Pack the LS byte of each halfword interleaved into a word | B/0 XXhgXXdc | A/E XXfeXXba | → | Memory hgfedcba | |
| STHW_W 202 | Pack the LS halfword of each word into a word | B/0 XXXXhgfe | A/E XXXXdcba | → | Memory hgfedcba | |
| STBH_D 204 | Pack the LS byte of each halfword into a double | B0 XXpoXXnm | BE XXlkXXji | A0 XXhgXXfe | AE XXdcXXba | → Memory ponmlkji hgfedcba |
| STBHI_D 206 | Pack the LS byte of each halfword interleaved into a double | B0 XXpoXXlk | BE XXnmXXji | A0 XXhgXXdc | AE XXfeXXba | → Memory ponmlkji hgfedcba |
| STHW_D 208 | Pack the LS halfword of each word into a double | B0 XXXXponm | BE XXXXlkji | A0 XXXXhgfe | AE XXXXdcba | → Memory ponmlkji hgfedcba |
| STHWI_D 210 | Pack the LS halfword of each word interleaved into a double | B0 XXXXponm | BE XXXXhgfe | A0 XXXXlkji | AE XXXXdcba | → Memory ponmlkji hgfedcba |

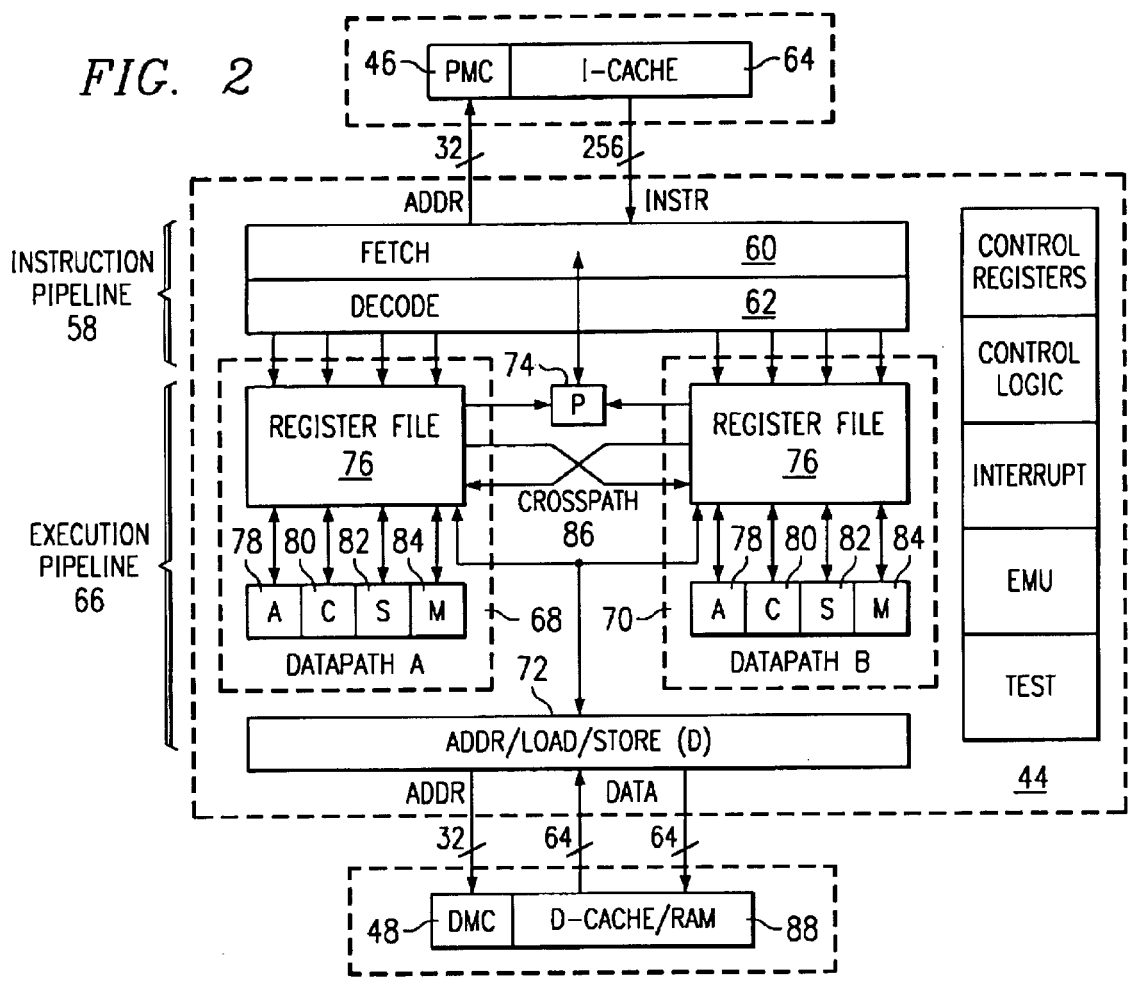

FIG. 2

| UNIT GROUP | OPERATIONS | REGISTER FILE ACCESS | |
|---|---|---|---|
| | | PRIMARY DATAPATH | ALTERNATIVE DATAPATH |
| A | - GENERAL ARITHMETIC<br>- BOOLEAN AND CONTROL REGISTER ACCESS | R/W | R |
| C | - COMPARE, SHIFT, BOOLEAN<br>- ARITHMETIC: ADD, SUB | R/W | R |
| S | - SHIFT, ROTATE, EXTENDED BOOLEAN<br>- ARITHMETIC: ADD, SUB | R/W | R |
| M | - MULTIPLY<br>- ARITHMETIC: ADD, SUB | R/W | R |
| D | - LOAD<br>- STORE<br>- ADDRESS COMPUTATION | W TO BOTH<br>R FROM BOTH<br>R/W BOTH | |
| P | - BRANCH | R FROM BOTH | |

FIG. 3    R=READ, W=WRITE

| STAGE | FUNCTION |
|---|---|
| F0 | SEND PC TO PROGRAM MEMORY CONTROLLER. LDIP ASSIGNED. |
| F1 | CACHE BLOCK SELECT. |
| F2 | ADDRESS PHASE OF INSTRUCTION CACHE ACCESS. |
| F3 | DATA PHASE OF INSTRUCTION CACHE ACCESS. |
| F4 | FETCH PACKET SENT TO DSP. |

*FIG. 5a*

| STAGE | FUNCTION |
|---|---|
| D0 | DETERMINE VALID INSTRUCTIONS IN CURRENT FETCH PACKET. |
| D1 | SORTS INSTRUCTIONS IN EXECUTE PACKET ACCORDING TO DESTINATION UNITS. |
| D2 | INSTRUCTIONS SENT TO DESTINATION UNITS. CROSSPATH REGISTER READS OCCUR. |
| D3 | UNITS DECODE INSTRUCTIONS. REGISTER FILE READ (2ND PHASE). |

*FIG. 5b*

| UNIT | STAGE | FUNCTION |
|---|---|---|
| NON M UNIT | E | EXECUTION OF OPERATION BEGINS AND COMPLETES. FULL RESULT AVAILABLE AT END OF CYCLE. |
| M UNIT | M0 | EXECUTION OF MULTIPLY OPERATION BEGINS. (OR, NON-MULTIPLY OPERATION BEGINS AND COMPLETES.) |
| M UNIT | M1 | MULTIPLY OPERATION CONTINUES. (OR, NON-MULTIPLY RESULT WRITTEN TO REGISTER FILE (PHASE 1).) |
| M UNIT | M2 | MULTIPLY OPERATION COMPLETES. |

*FIG. 5c*

| STAGE | FUNCTION |
|---|---|
| E | ADDRESS GENERATION OCCURS. REGISTER FILE ACCESS FOR READ DATA. |
| L0 | LOAD ADDRESS GENERATED DURING E IS SENT TOWARDS THE DMC. |
| L1 | ADDRESS DECODE, TC ARBITRATION, TAG COMPARES. |
| L2 | ADDRESS DECODE, TC ARBITRATION, TAG COMPARES. |
| L3 | ADDRESS PHASE OF DATA CACHE ACCESS. |
| L4 | DATA PHASE OF DATA CACHE ACCESS. |
| L5 | 64-BIT DATA SENT TO DSP. |

*FIG. 5d*

| STAGE | FUNCTION |
|---|---|
| E | ADDRESS GENERATION OCCURS. REGISTER FILE ACCESS FOR WRITE DATA. |
| S0 | ADDRESS SENT TO DMC. |
| S1 | ADDRESS DECODE IN DMC. WRITE DATA ALIGNMENT. |
| S2 | TAG COMPARE IN DMC. WRITE DATA SENT TO DMC. |
| S3 | ADDRESS PHASE IN DATA CACHE. |
| S4 | DATA PHASE IN DATA CACHE. |

*FIG. 5e*

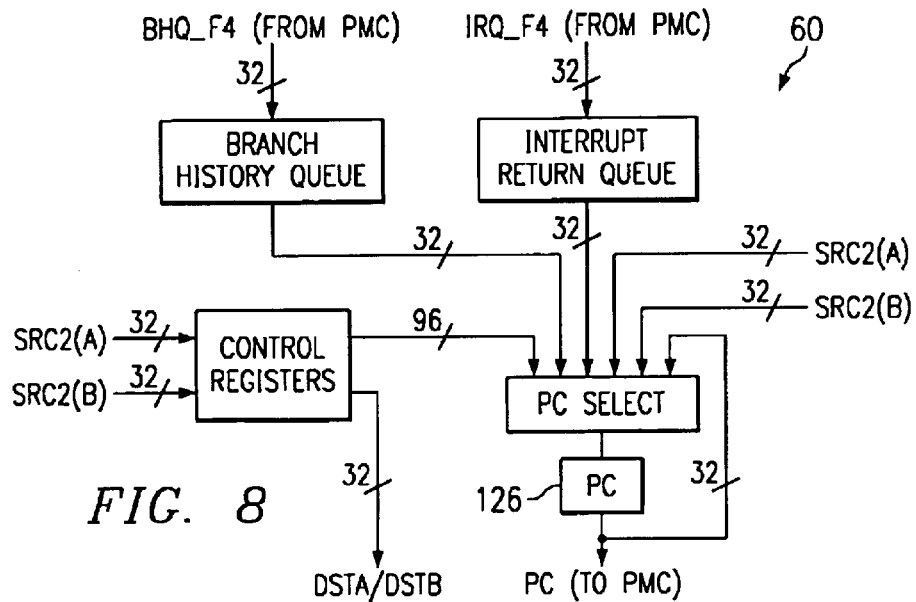

FIG. 8

| || [PREDICATION REG] INSTRUCTION_MNEMONIC .UNIT-DATAPATH-CROSSPATH OP1, OP2, DST |
|---|

WHERE:
|| = TO BE SCHEDULED IN PARALLEL WITH PRECEDING INSTRUCTION(S)
[PREDICATION REG] = REGISTER CONTAINING PREDICATION VALUE
.UNIT = A,C,S,M,D,P UNIT GROUPS
DATAPATH = 1 FOR DATAPATH A, 2 FOR DATAPATH B
CROSSPATH = X IF ONE OPERAND COMES FROM OPPOSITE REGISTER FILE
OP1, OP2 = SOURCE REGISTERS
DST = DESTINATION REGISTER

| UNIT GROUP | ASSEMBLY NOTATIONS | | ASSEMBLY EXAMPLES | WITH CROSSPATH |
|---|---|---|---|---|
|  | DATAPATH A | DATAPATH B |  |  |
| A | .A1 | .A2 | ADD  .A1 A1,A2,A3<br>SUB  .A2 B1,B2,B3 | ADD  .A1X A1,B2,A3<br>SUB  .A2X B1,A2,B3 |
| C | .C1 | .C2 | CMPEQ .C1 A1,A2,A3<br>CMPEQ .C2 B1,B2,B3 | CMPEQ .C1X A1,B2,A3<br>CMPEQ .C2X B1,A2,B3 |
| S | .S1 | .S2 | SHL  .S1 A1,A2,A3<br>SHL  .S2 B1,B2,B3 | SHL  .S1X A1,B2,A3<br>SHL  .S2X B1,A2,B3 |
| M | .M1 | .M2 | MPY  .M1 A1,A2,A3<br>MPY  .M2 B1,B2,B3 | MPY  .M1X A1,B2,A3<br>MPY  .M2X B1,A2,B3 |
| D | .D | | LDB  .D *A8,A12<br>STB  .D A8,*A12<br>ADDAH .D A8,A2,B1 | n/a |
| P | .P | | B    A8 | n/a |

| Mnemonic | Action | Operation | | |
|---|---|---|---|---|
| LDB[U] 168 | Load byte | Memory XXXXXXba | B/A → SSSSSSba → 000000ba | (signed (s)) (unsigned (u)) |
| LDH[U] 170 | Load halfword | Memory XXXXdcba XXXXdcba | B/A → SSSSdcba → 0000dcba | (s) (u) |
| LDW 172 | Load word | Memory hgfedcba | B/A → hgfedcba | |
| LDD 174 | Load double | Memory ponmlkji hgfedcba | B/O  A/E → ponmlkji hgfedcba | |

FIG. 17

| Mnemonic | Action | Operation |
|---|---|---|
| STB 176 | Store byte | B/A Memory xxxxxxba → 000000ba |
| STH 178 | Store halfword | B/A Memory XXXXdcba → 0000dcba |
| STW 180 | Store word | B/A Memory hgfedcba → hgfedcba |
| STD 182 | Store double | B/O  A/E  Memory ponmlkji hgfedcba → ponmlkji hgfedcba |

| Mnemonic | Action | Operation | | | | |
|---|---|---|---|---|---|---|
| LDW_BH[U] 184 | Word: unpack the bytes into halfwords | Memory hgfedcba hgfedcba → → | B/O SShgSSfe 00hg00fe | A/E SSdcSSba 00dc00ba | (signed (s)) (unsigned (u)) | |
| LDW_BHI[U] 186 | Word: unpack the bytes into halfwords interleaved | Memory hgfedcba hgfedcba → → | B/O SShgSSdc 00hg00dc | A/E SSfeSSba 00fe00ba | (s) (u) | |
| LDW_HW[U] 188 | Word: unpack the halfwords into words | Memory hgfedcba hgfedcba → → | B/O SSSShgfe 0000hgfe | A/E SSSSdcba 0000dcba | (s) (u) | |
| LDD_BH[U] 190 | Double: unpack the bytes into halfwords | Memory ponmlkji hgfedcba → → | BO SSpoSSnm 00po00nm | BE SSlkSSji 00lk00ji | AO SShgSSfe 00hg00fe | AE SSdcSSba 00dc00ba (s) (u) |
| LDD_BHI[U] 192 | Double: unpack the bytes into halfwords interleaved | Memory ponmlkji hgfedcba → → | BO SSpoSSlk 00po00lk | BE SSnmSSji 00nm00ji | AO SShgSSdc 00hg00dc | AE SSfeSSba 00fe00ba (s) (u) |
| LDD_HW[U] 194 | Double: unpack the halfwords into words | Memory ponmlkji hgfedcba → → | BO SSSSponm 0000ponm | BE SSSSlkji 0000lkji | AO SSSShgfe 0000hgfe | AE SSSSdcba 0000dcba (s) (u) |
| LDD_HWI[U] 196 | Double: unpack the halfwords into words interleaved | Memory ponmlkji hgfedcba → → | BO SSSSponm 0000ponm | BE SSSShgfe 0000hgfe | AO SSSSlkji 0000lkji | AE SSSSdcba 0000dcba (s) (u) |

FIG. 18

| Mnemonic | Action | Operation | | |
|---|---|---|---|---|
| STBH_W 198 | Pack the LS byte of each halfword into a word | B/O XXhgXXfe | A/E XXdcXXba | → Memory hgfedcba |
| STBHI_W 200 | Pack the LS byte of each halfword interleaved into a word | B/O XXhgXXdc | A/E XXfeXXba | → Memory hgfedcba |
| STHW_W 202 | Pack the LS halfword of each word into a word | B/O XXXXhgfe | A/E XXXXdcba | → Memory hgfedcba |
| STBH_D 204 | Pack the LS byte of each halfword into a double | BO XXpoXXnm | BE XXlkXXji | AO XXhgXXfe AE XXdcXXba | → Memory ponmlkji hgfedcba |
| STBHI_D 206 | Pack the LS byte of each halfword interleaved into a double | BO XXpoXXlk | BE XXnmXXji | AO XXhgXXdc AE XXfeXXba | → Memory ponmlkji hgfedcba |
| STHW_D 208 | Pack the LS halfword of each word into a double | BO XXXXponm | BE XXXXlkji | AO XXXXhgfe AE XXXXdcba | → Memory ponmlkji hgfedcba |
| STHWI_D 210 | Pack the LS halfword of each word interleaved into a double | BO XXXXponm | BE XXXXhgfe | AO XXXXlkji AE XXXXdcba | → Memory ponmlkji hgfedcba |

FIG. 19

DATA PROCESSING SYSTEM WITH REGISTER STORE/LOAD UTILIZING DATA PACKING/UNPACKING

This application claims priority under 35 USC §119(e)(1) of Provisional Application No. 60/173,761, filed Dec. 30, 1999.

FIELD OF THE INVENTION

This invention relates to data processing devices, electronic processing and control systems and methods of their manufacture and operation.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. The increasing demands of technology and the marketplace make desirable even further structural and process improvements in processing devices, application systems and methods of operation and manufacture.

SUMMARY OF THE INVENTION

In accordance with a preferred embodiment of the invention, there is disclosed a data processing system which efficiently packs register data while storing it to memory using a single processor instruction. The system comprises a memory comprising a plurality of memory locations, and a central processing unit core comprising at least one register file with a plurality of registers. The core is connected to the memory for loading data from and storing data to the memory locations. The core is responsive to a load instruction to retrieve at least one data word from the memory and parse the data word over selected parts of at least two data registers in the register file. The number of data registers is greater than the number of data words parsed into the registers. In a further embodiment, the load instruction selects sign or zero extend for the data parsed into the data registers. In another embodiment, the parse comprises unpacking the lower and higher half-words of each data word into a pair of data registers. In yet another embodiment, the parse comprises unpacking the bytes of each data word into the lower and higher half-words of each of a pair of data registers. In yet another embodiment, the data is interleaved as it is parsed into the data registers.

In accordance with another preferred embodiment of the invention, there is disclosed a data processing system which unpacks data read from memory while loading it into registers using a single processor instruction. The system comprises a memory comprising a plurality of memory locations, and a central processing unit core comprising at least one register file with a plurality of registers. The core is connected to the memory for loading data from and storing data to the memory locations. The core is responsive to a store instruction to concatenate data from selected parts of at least two data registers into at least one data word and save the data word to memory. The number of data registers is greater than the number of data words concatenated from the data registers. In a further embodiment, there are two data registers and the concatenate comprises packing the lower half-words of the two data registers into the lower and higher half-words of the data word. In another embodiment, there are four data registers and two data words, and the concatenate comprises packing the lower half-words of the four data registers into the lower and higher half-words of each of the two data words. In yet another embodiment, there are two data registers, and the concatenate packs the lower bytes of the lower and higher half-words of each of the two data registers into the data word. In yet another embodiment, the data is interleaved as it is concatenated into the data word.

An advantage of the inventive concepts is that both memory storage space and central processor unit resources can be utilized efficiently when working with packed data. A single store or load instruction can perform all of the tasks that used to take several instructions, while at the same time conserving memory space.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 2 is a top-level block diagram of a DSP cluster from the microprocessor of FIG. 1;

FIG. 3 is a chart of the resource availability and register file access for the datapath unit groups in the DSP cluster of FIG. 2;

FIGS. 5a, 5b, 5c, 5d and 5e are charts illustrating the functions of each stage of the pipelines of FIG. 4;

FIG. 8 is a block diagram of the fetch unit of the DSP core of FIG. 2;

FIG. 15 is a chart of the basic assembly format for DSP core instructions;

FIG. 16 is a chart of standard instructions for loading data from memory to registers;

FIG. 17 is a chart of standard instructions for storing data from registers into memory;

FIG. 18 is a chart of instructions for unpacking data while loading from memory to registers; and FIG. 19 is a chart of instructions for packing data while storing to memory from registers.

DETAILED DESCRIPTION OF THE PREFERRED EMBODIMENTS

Figure 1:
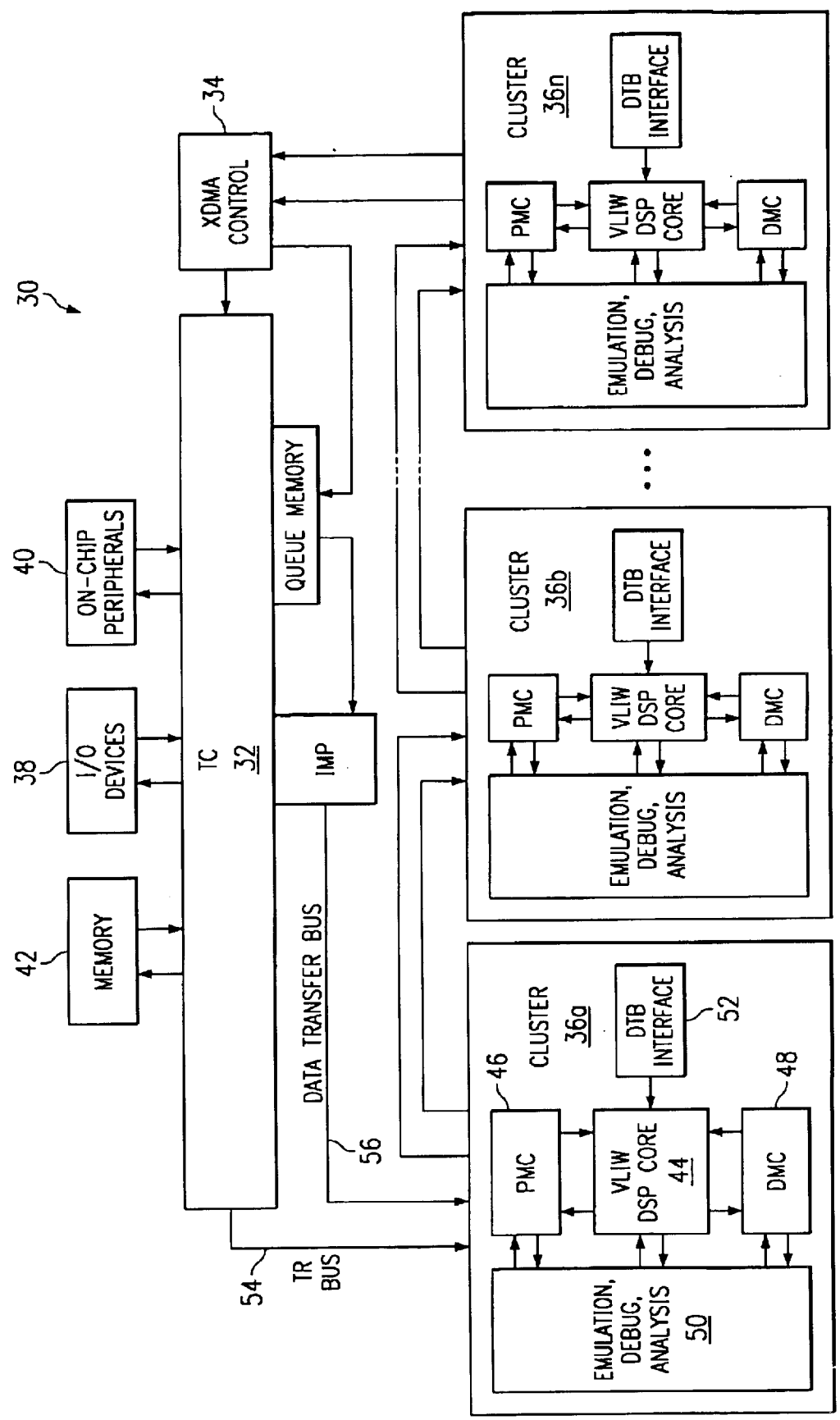
FIG. 1 is a top-level block diagram of a microprocessor.

According to a preferred embodiment of the present invention, a microprocessor architecture is provided including certain advantageous features. FIG. 1 is a high-level block diagram of an exemplary microprocessor in which a preferred embodiment of the invention is presented. In the interest of clarity, FIG. 1 shows only those portions of microprocessor 30 that may be relevant to an understanding of an embodiment of the present invention. Details of the general construction of microprocessors are well known, and may be found readily elsewhere. For example, U.S. Pat. No. 5,072,418 issued to Frederick Boutand, et al., describes a DSP in detail and is incorporated herein by reference. Details of portions of microprocessor 30 relevant to an embodiment of the present invention are explained in sufficient detail below so as to enable one of ordinary skill in the microprocessor art to make and use the invention.

Generally, microprocessor 30 comprises Transfer Controller (TC) 32, External Direct Memory Access (XDMA) Controller 34, and DSP clusters 36a–36n. Transfer Controller 32 provides for all data communication among DSP clusters 36a–36n, external input/output (I/O) devices 38, on-chip peripherals 40, and memory 42. While any given cluster such as DSP cluster 36a can access its own internal local memory within the cluster without permission from TC 32, any access to global memory outside of its local memory requires a TC directed data transfer, whether the access is to external memory or to another DSP cluster's own local memory. XDMA Controller 34 provides handling of externally initiated DMA requests while avoiding interrupting any DSP clusters 36a–36n. Each DSP cluster 36 comprises a very long instruction word (VLIW) DSP core 44, Program Memory Controller (PMC) 46, Data Memory Controller (DMC) 48, an emulation, analysis and debug block 50, and Data Transfer Bus (DTB) interface 52. DSP clusters 36 and TC 32 communicate over a pair of high throughput buses: Transfer Request (TR) bus 54, which is used to specify and request transactions in TC 32, and DTB 56, which is used to load and store data from objects in the global memory map. The overall architecture is scaleable, allowing for the implementation of up to 255 DSP clusters 36, although three DSP clusters 36 is currently the preferred embodiment. It should be noted that architectural details, such as the number of DSP clusters 36, and instruction set details are not essential to the invention. The microprocessor architecture outlined in FIG. 1 is exemplary only, and the invention is applicable to many microprocessor architectures.

FIG. 2 is a high-level block diagram illustrating more detail of DSP core 44. DSP core 44 is a 32-bit eight-way VLIW pipelined processor. The instruction set consists of fixed length 32-bit reduced instruction set computer (RISC) type instructions that are tuned for DSP applications. Almost all instructions perform register-to-register operations, and all memory accesses are performed using explicit load/store instructions. As shown in FIG. 2, instruction pipeline 58 consists of fetch stage 60 and decode stage 62. Fetch stage 60 retrieves program codes into the processor core from instruction cache 64 in groups of eight instructions called a fetch packet. Decode stage 62 parses the fetch packet, determines parallelism and resource availability, and constructs an execute packet of up to eight instructions. Each instruction in the execute packet is then translated into control signals to drive the appropriate units in execution pipeline 66. Execution pipeline 66 consists of two symmetrical datapaths, datapath A 68 and datapath B 70, a common 64-bit load/store unit group, D-unit group 72, and a common branch unit group, P-unit group 74. Each datapath contains 32-word register file (RF) 76, and four execution unit groups, A-unit group 78, C-unit group 80, S-unit group 82, and M-unit group 84. Overall there are ten separate unit groups in execution pipeline 66, of which eight may be scheduled concurrently every cycle. Each functional unit group contains plural functional units, some of which are duplicated between unit groups. In total there are nine 32-bit adders, four 32-bit shifters, three Boolean operators, and two 32×16 multipliers. The multipliers are each configurable into two 16×16 or four 8×8 multipliers.

FIG. 3 is a chart summarizing the resource availability and register accessibility for all of the functional unit groups in execution pipeline 66. Upon receiving control signals from decode stage 62, source operands are read from register file(s) 76 and sent to the execution unit groups. A summary of the types of operations performed by each unit group are listed in the Operations column in FIG. 3. The unit groups' access to the two register files in DSP core 44 is summarized in the Register File Access column in FIG. 3. Each datapath-specific unit group has direct read-access to its own register file (primary datapath), and may also read the other register file (alternative datapath) via read-only crosspath 86, shown in FIG. 2. The execution unit groups then carry out the operations and write back the results into their respective register file. There is no write access to the other datapath's register file for the datapath-specific unit groups. D-unit group 72 performs address computation, and has read/write access to both register files 76 and interfaces with data cache/random access memory (RAM) 88 via a 32-bit address bus and 64-bit data bus. P-unit group 74 handles branching and other program control flow, and has read access to both register files 76.

Figure 4:
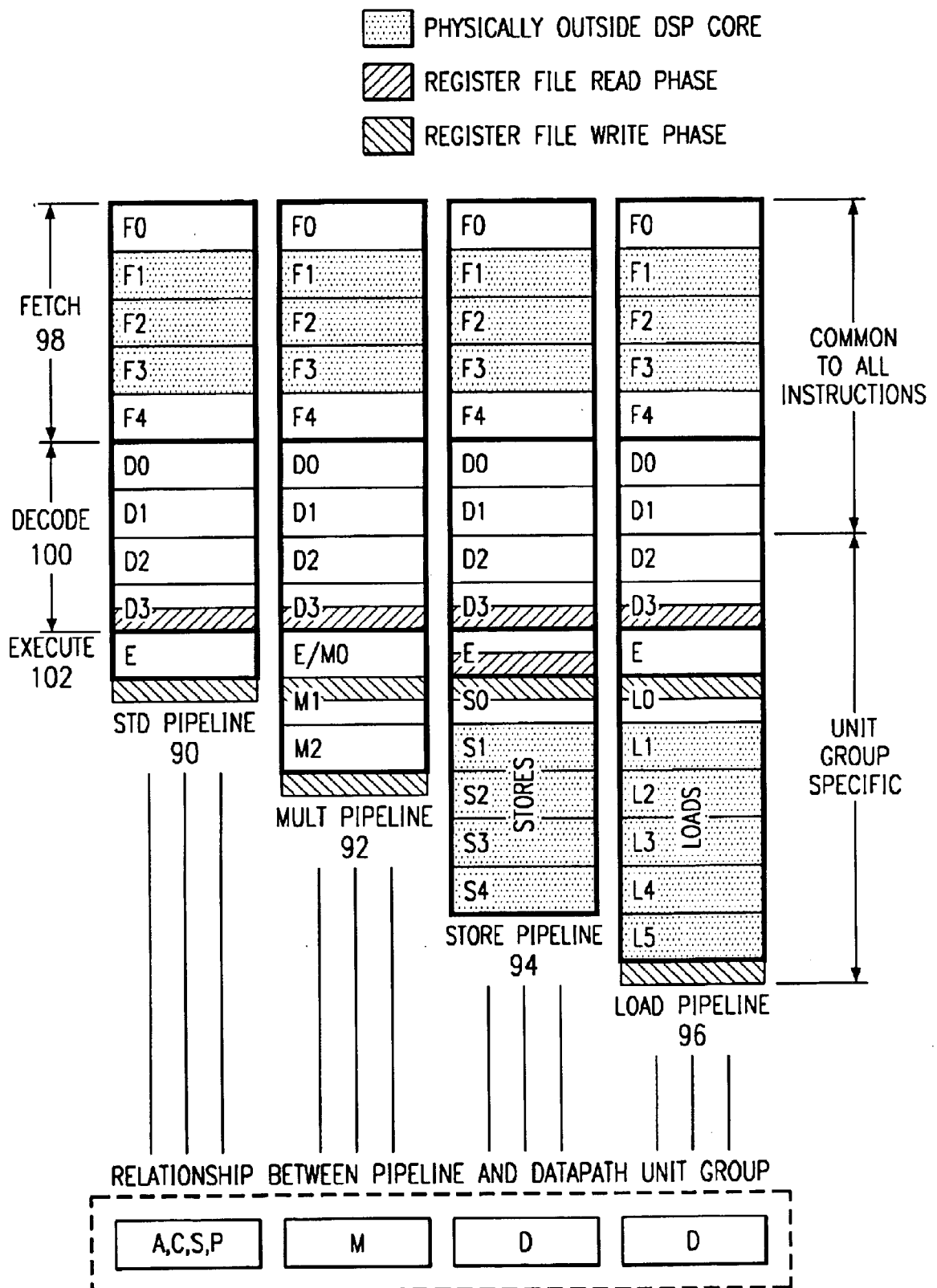
FIG. 4 is a chart of the DSP pipeline depth of the DSP core within the DSP cluster of FIG. 2.

DSP core 44 of FIG. 2 comprises a deep pipeline with minimal hardware logic control, thus facilitating high clock speeds and high data throughput, and providing a high degree of instruction execution control at the programming level. The DSP hardware does not manage data dependencies (e.g., read-before-write, write collision, etc.), therefore it is the compiler's or assembler's responsibility to take delay-slot requirements into account in instruction scheduling. FIG. 4 illustrates the four pipeline types utilized by DSP core 44: standard pipeline 90, used by the A-, C-, S-, and P-unit groups; multiply pipeline 92, used by the M-unit group; store pipeline 94, used by the D-unit group; and load pipeline 96, also used by the D-unit group. The pipeline depth varies from 10 stages for standard pipeline 90, to 13 stages for multiply pipeline 92, to 15 stages for store pipeline 94, and up to 16 stages for load pipeline 96. An operation advancing down the pipeline advances one stage every CPU cycle, which refers to the period during which an execute packet occupies any given execute stage. A CPU cycle equates to a clock cycle when there are no stalls. Conceptually, the DSP pipeline may be partitioned into two main pipelines, the instruction pipeline and the execution pipeline. The instruction pipeline is common to all instructions and includes the 5-stage instruction fetch function 98, and the 4-stage decode/dispatch function 100. The depth and functionality of execution pipeline 102 is instruction dependent. For example, non-multiply operations performed in the M-unit group do not require the deep pipeline necessary for multiply operations, so the results of these operations are available for write-back in stage M1. Similarly, the results of address math operations performed in the D-unit group are written to the register file at the end of stage E. Thus, even though these example instructions are performed by the M- and D-unit groups, respectively, their pipelines appear to be that of the standard pipeline.

Charts outlining the functions of each pipeline stage are shown in FIGS. 5*a*-5*e*. Fetch stages F0-F4 are listed in FIG. 5*a*. Most fetch stages occur outside the DSP core itself. Stage F0 initiates the fetch cycle by sending the program counter (PC) value to PMC 46. Stages F1, F2 and F3 occur outside DSP core 44 in PMC 46, with the new fetch packet being received by DSP core 44 at the end of stage F4. FIG. 5*b* lists decode stages D0-D3. Stages D0 and D1 are common to all execution unit groups and operate on every instruction executed by DSP core 44. Stage D0 determines the validity of instructions in the current fetch packet and determines the next fetch packet. Stage D1 sorts the current execution packet instructions by unit group. The current execution packet is then sent to the destination pipeline/unit group during stage D2. In stage D3, units decode received instructions, unit level control signals are generated, and register file access is performed.

The P-unit group is not datapath specific, but the branching pipeline operates like the A-, C-, and S-unit groups in that it has a single execution stage, with data being written to the program counter in the same write phase as the standard pipeline. The program counter is updated at the end of stage E, implying that the next CPU cycle will be stage F0 for the new address. This means that from the point a branch instruction is in stage E, there are ten CPU cycles until execution begins with instructions from the new address.

FIG. 5*c* lists execution stages E and M0-M2. Execution for non-multiply operations is performed in a single execute cycle, E. These include non-multiply arithmetics, Boolean operations, shifts, packs/unpacks, and address calculations. An extended execution pipeline, stages M0-M2, is provided for multiply operations due to their complexity. Functionally, stage M0 corresponds to stage E. Stages M1-M2 are required by the time necessary to perform a worst case 32 bit×16 bit multiply. The increased latency forces three delay slots on multiply operations. M-unit group 84 performs all multiply operations. Additionally, M-unit group 84 performs a few non-multiply instructions, which complete in stage M0.

FIG. 5*d* lists load stages L0-L5, and FIG. 5*e* lists store stages S0-S4. D-unit group 72 which performs these operations is not datapath specific, so datapaths A 68 and B 70 share a single load/store interface between them. Load/store operations are up to 64 bits wide and may reference the register file of either datapath. Address calculations for load/store operations complete in stage E. The generated address is then sent to DMC 48 in stage L0/S0. The load and store stages begin to differ at this point. For data loads, address decode takes two stages, L1 and L2. Address and data phases of data cache access occur in stages L3 and L4, and then read data is sent to DSP core 44 in stage L5 to complete the load. For data stores, address decode takes one stage, S1. Write data is sent to DMC 48 in stage S2, and then address and data phases of data cache access occur in stages S3 and S4 to complete the store.

Figure 6A:
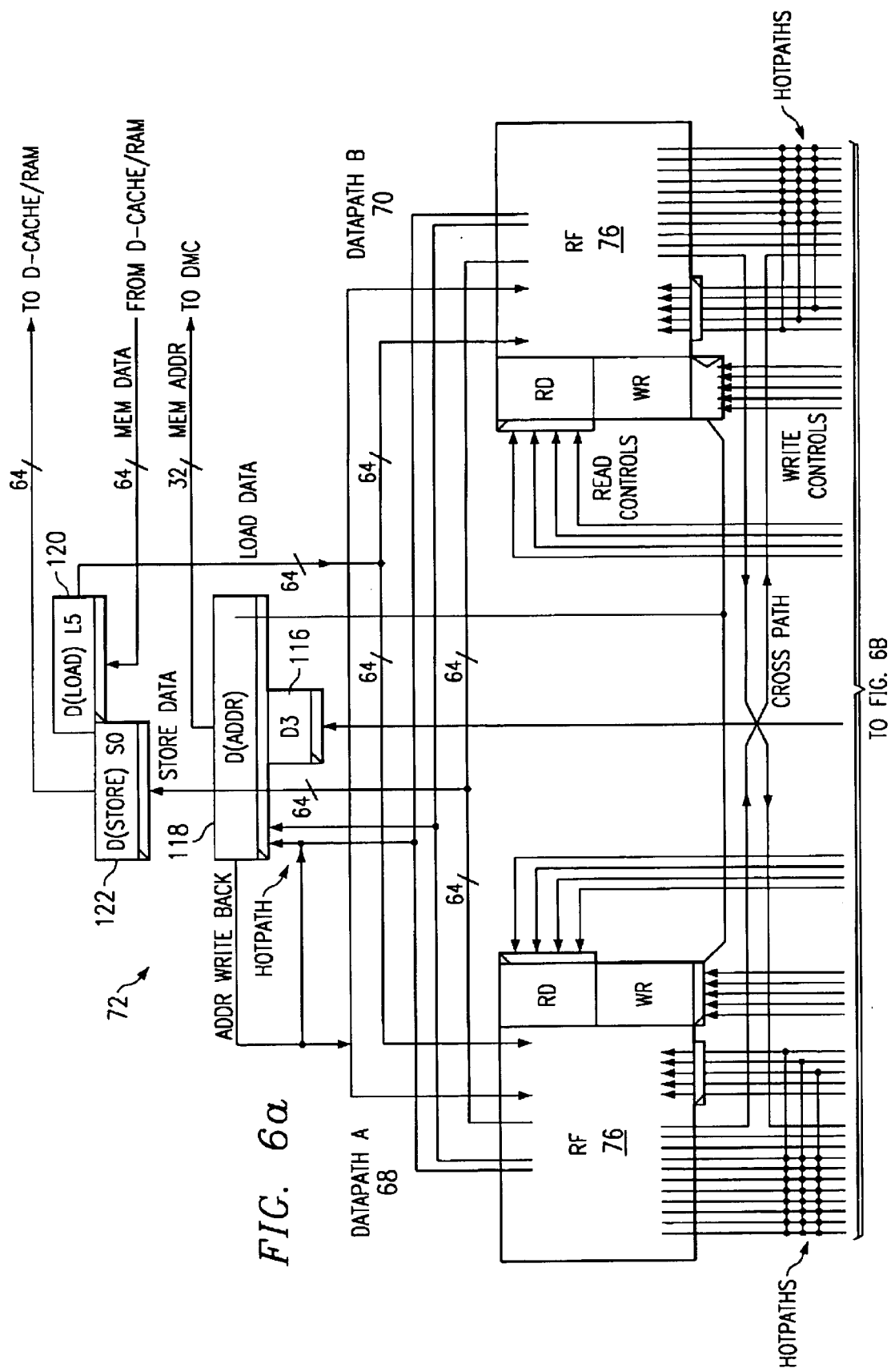
FIGS. 6a and 6b are a block diagram of the top-level buses of the pipeline of the DSP core of FIG. 2.
Figure 6B:
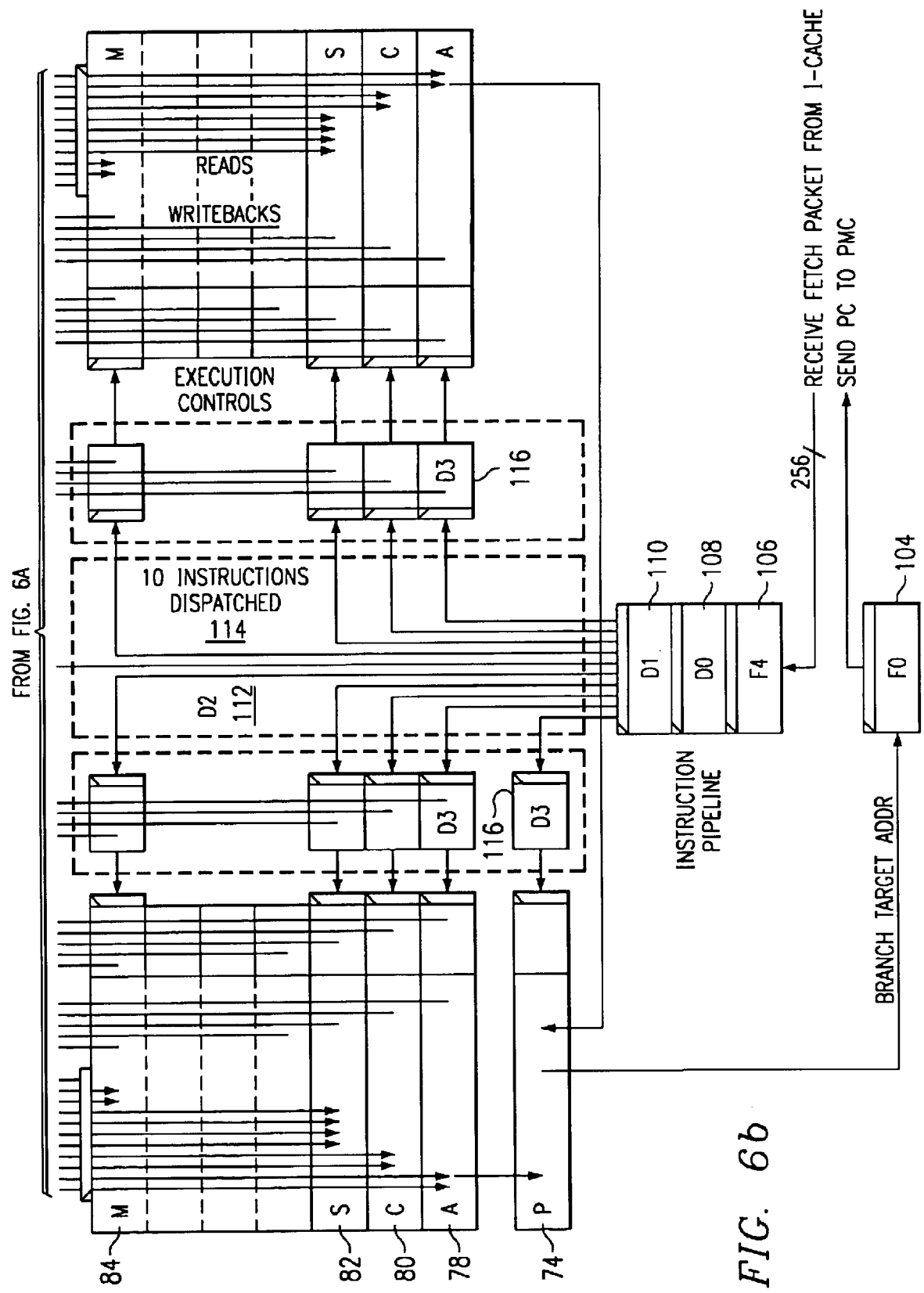
Figure 7:
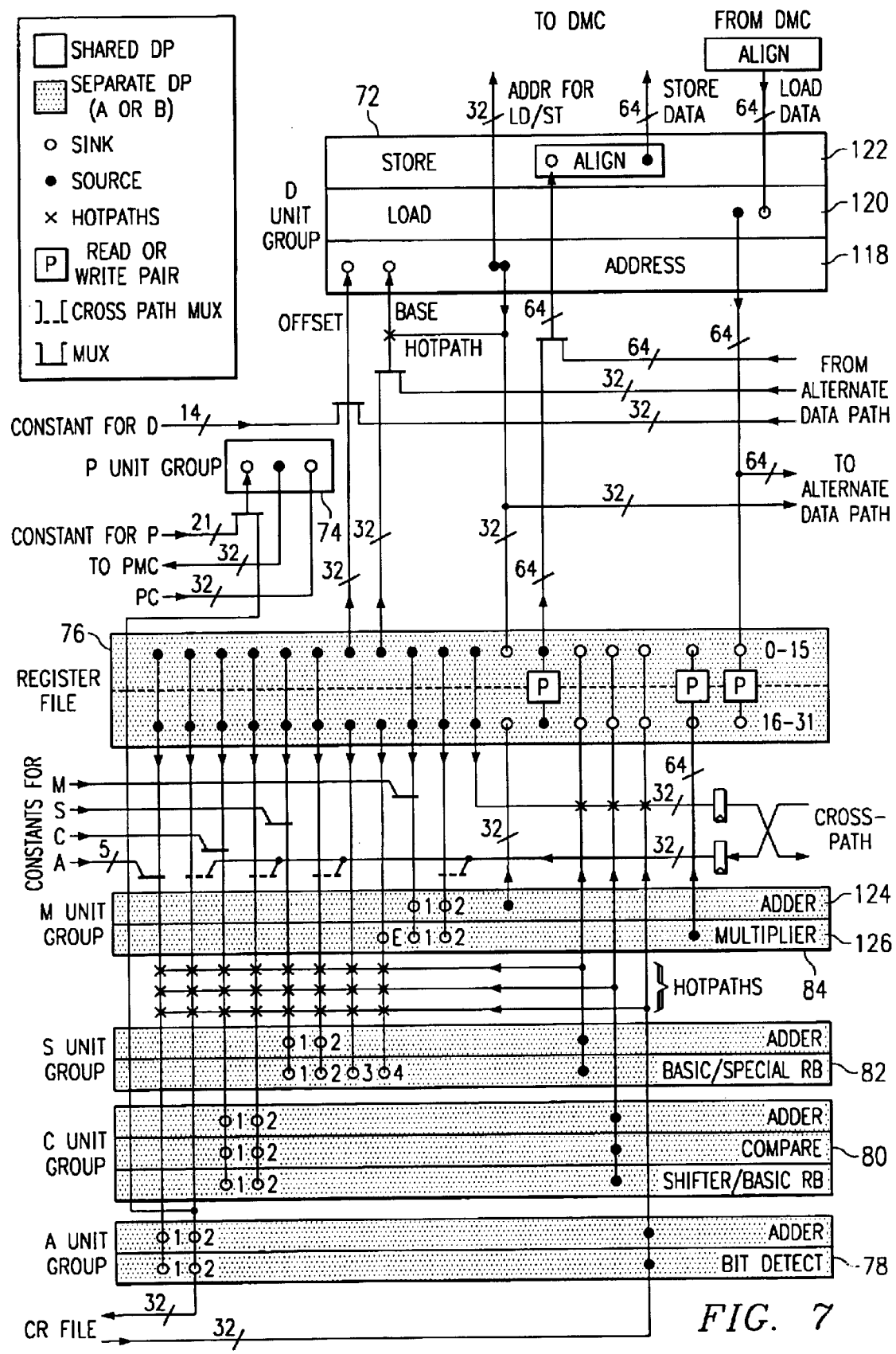
FIG. 7 is a block diagram of the datapath in the execution pipeline of the DSP core of FIG. 2.

FIGS. 6*a*, 6*b* and 7 illustrate the functionality of the instruction and execution pipelines in more detail. FIGS. 6*a* and 6*b* are the two halves of a block diagram of the top-level buses of the DSP core pipeline. The instruction pipeline, serving as the front end of DSP core 44, fetches instructions into the processor from PMC 46 and feeds the execution engines. Stage F0 104 resides in DSP core 44, and contains the program counter and branching control. Stages F1, F2 and F3 (not shown) reside in PMC 46, where memory addresses are decoded and cache accesses are performed. Stage F4 106 is reserved solely for the transport of the 256-bit fetch packet from PMC 46 to the DSP core 44. Stages D0 108 and D1 110 are used to parse the fetch packet and to assign individual 32-bit instructions to appropriate execute unit groups. Stage D2 112 is reserved solely for the transport of these instructions to the execute unit groups. There are physically 10 instruction buses 114 sent to stage D3 116, which are distributed locally to the execute unit groups: one bus to each A- 78, C- 80, S- 82, and M-unit group 84, in each datapath 68 and 70, one bus to P-unit group 74, and one bus to D-unit group 72. Only a maximum of 8 instructions, however, may be dispatched to the execute pipeline in a given cycle. Stage D3 116 houses the final decoders which translate instruction opcodes into specific control signals to drive the respective execute unit groups. Stage D3 116 is also where register file 76 is accessed for operands.

Continuing from stage D3 116, the execute pipeline splits off into the two main datapaths, A 68 and B 70, each containing four execute unit groups, A 78, C 80, S 82, M 84, and register file 76. A unit group 78, C unit group 80, and S unit group 82 are 32-bit datapath hardware that perform single-cycle general arithmetic, shifting, logical and Boolean operations. M unit group 84 contains 2 functional units: a single-cycle 32-bit adder and a three-stage 64-bit multiplier. The execute pipeline also contains D unit group 72 and P unit group 74, each of which serves both datapaths.

D-unit group 72 has 3 functional units: single-cycle 32-bit address generator 118, 64-bit load unit 120 and 64-bit store unit 122. Address generator 118 functions in the pipeline as an execute unit similar to the A, C and S unit groups. Load unit 120 has 6 pipeline stages. Memory addresses computed by address generator 118 and load commands are formatted by load unit 120 and sent to DMC 48 in stage L0. DMC 48 uses stages L1, L2, L3 and L4 to decode memory addresses and perform cache access. Data alignment and zero/sign extension are done in stage L4. Stage L5 is reserved solely for data transport back to DSP core 44. Store unit 122 has 5 pipeline stages. Similar to load unit 120 operation, addresses and store commands are sent to DMC 48 in stage S0. The data to be stored is read out from register file 76 one cycle earlier in stage E, at the same time the address is being generated. The store data is also sent to DMC 48 in the same cycle as addresses and commands in stage S0. DMC 48 uses stages S1, S2, S3 and S4 for address decode and cache access for storing data.

P-unit group 74 performs branch computation and is a special case. With respect to timing, P-unit group 74 resides in the execute pipeline just like the single cycle units A 78, C 80 and S 82. However, since the program counter and control registers are located within the fetch unit in stage F0 104, P-unit group 74 resides physically with the fetch unit.

FIG. 7 is a detailed block diagram of the execute pipeline datapath. For clarity, the structure and interconnection between shared D-unit group 72 and shared P-unit group 74 and only one of the two separate main datapaths (A-unit group 78, C-unit group 80, S-unit group 82, M-unit group 84) are described. As instructions arrive at stage D3 of the instruction pipeline, decode logic peels off source and destination register addresses for each of the execute unit groups and sends them to RF 76 to fetch operands. In case of instructions with cross-file operands, RF access is performed a cycle earlier in stage D2, and stage D3 is used for cross-file transport. In stage D3, the instruction opcode is also decoded into control signals. At the end of stage D3, operand data and control signals are set-up to be sent to the respective execute unit groups.

Register file 76 is constructed of 2 banks of sixteen 32-bit registers each. There are 12 read ports and 6 write ports. In order to supply the many execute resources in the datapath while conserving read/write ports, the two read ports for base and offset of D-unit group 72 are shared with source 3 and 4 of S-unit group 82. In other words, the lower 16 registers (0–15) only go to D-unit group 72, and the upper 16 registers (16–31) only go to S-unit group 82. Similarly, the write port for the address result from D-unit group 72 is shared with the adder result from M-unit group 84. The lower 16 registers only go to D-unit group 72 and the upper 16 registers only go to M-unit group 84.

There are 3 classes of operation in the execute stages: single-cycle, 3-cycle, and load/store multi-cycle. All operations in A unit group 78, C unit group 80, and S unit group 82, the add functional unit in M-unit group 82, and address generation in D-unit group 72 are single cycle. Multiply functions in M unit group 84 take 3 cycles. Load and store operations take 6 and 5 cycles, respectively, in case of cache hit. Cycle counts are longer and variable in case of cache miss, because off-chip memory latency depends on the system configuration.

A unit group 78 and C unit group 80 each have two operand ports, source 1 and 2, while S unit group 82 has 4 operand ports, source 1, 2, 3, 4. Normal operations in S unit group 82 only uses 2 ports, while other operations such as Extended Rotate Boolean (ERB) use all 4 ports. If a condition requiring forwarding of a result from preceding instruction is detected, the forwarded result is selected, otherwise the RF operand is selected. Then the execute hardware (e.g. adder, shifter, logical, Boolean) performs the instructed operation and latches the result at the end of the E stage. The result from any one of the A, C, or S unit groups can be forwarded to the operand port of any of the A, C, or S unit groups within the same datapath. Address generator 118 in D unit group 72 operates similarly to the A, C, and S unit groups, except that D unit group's address result is only hotpathed back to itself. Adder 124 in M unit group 84 is similar, except that it has no hotpath. M unit group 84 has 3 operand ports. Normal multiplication uses 2 sources, while the extended port, which is shared with source 4 of S unit group 82, is used for Extended Multiply (EMPY) instructions. Multiplier 126 in M unit group 84 has 3 pipeline stages and no hotpath. The first 2 stages perform array multiplication in a carry/sum format. The last stage performs carry propagate addition and produces up to a 64-bit result. The 64-bit result is written back to RF 76 in pairs. Galois multiply hardware resides in M-unit group 84 alongside the main multiplier array, and it also takes 3 cycles. P unit group 74 operates just like the A, C, and S unit groups, except that it has no hotpath and that its result is consumed by the program control logic in the fetch unit instead of being written back to RF 76. P unit group 74 only has one operand port which is shared with source 2 of A unit group 78, which precludes parallel execution of a branch instruction and any instruction in A unit group 78.

FIGS. 8-14 are block diagrams illustrating more detail of the operation and hardware configuration of each of the unit groups within the DSP core. FIG. 8 is a top level diagram of fetch unit 60, which consists primarily of Program Counter 126 and other components generally responsible for controlling program flow, and the majority of control registers not directly related to the operation of a specific unit. With respect to program flow, fetch unit 60 has two main modes of operation: normal (sequential) operation and branch operation. Additionally, fetch unit 60 must initiate any interrupt/exception handling, resets, and privilege-level changes for DSP core 44.

Figure 9:
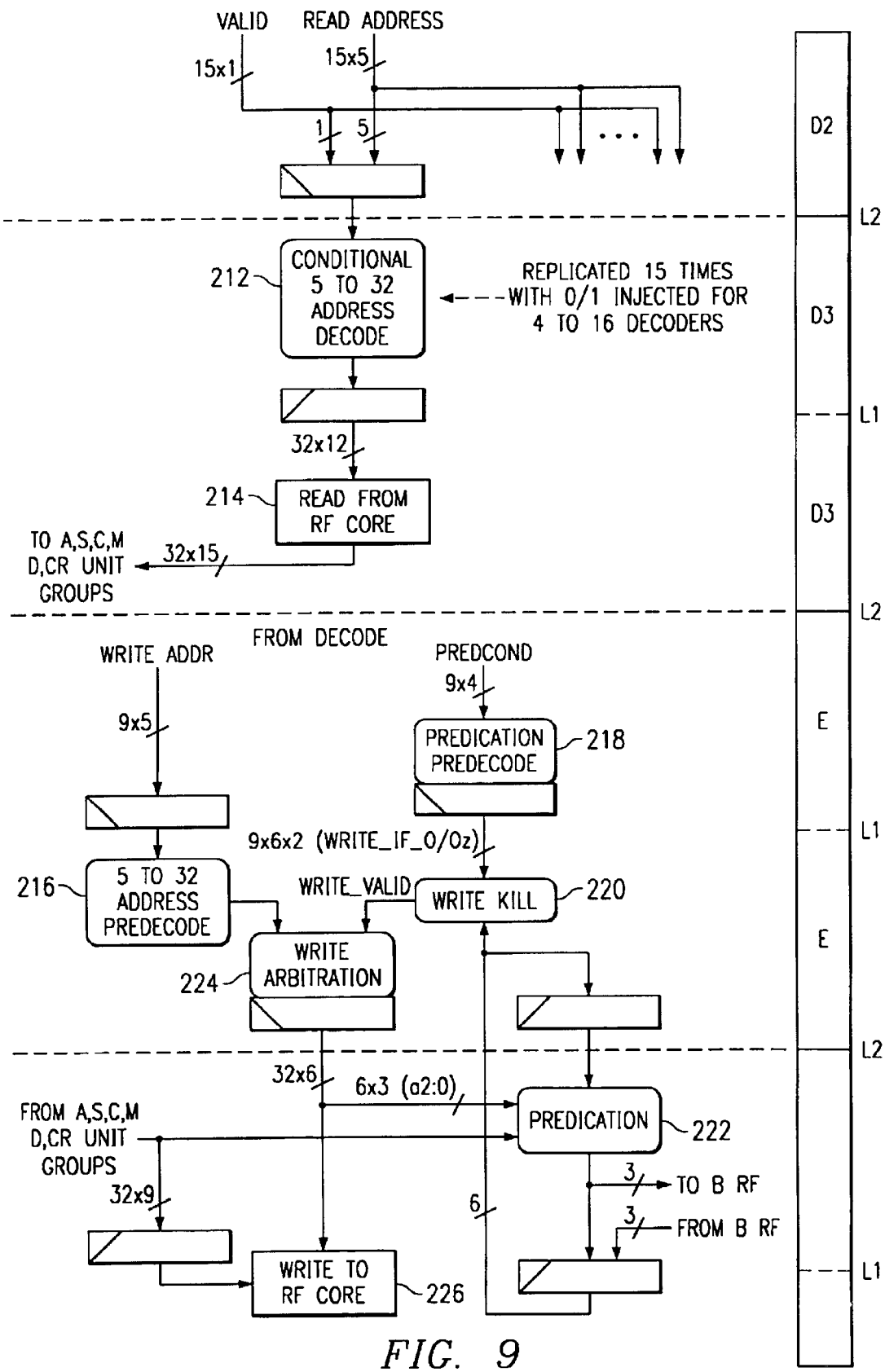
FIG. 9 is a block diagram of a register file of the DSP core of FIG. 2.

FIG. 9 is a top-level temporal block diagram of Register File 76. Within each DSP core 44 there are two datapaths, A 68 and B 70, each containing an identical register file. As used herein, the registers in the A (B) datapath are denoted by a0, . . . , a31 (b0, . . . , b31). Each register file 76 is composed of thirty-two 32-bit registers configured in upper and lower banks of 16 registers each. There are 12 read ports and 6 write ports for each register file 76.

FIG. 9 illustrates the portion of register file 76 of datapath A 68. As shown in FIG. 9, register file 76 receives up to 15 read register addresses and corresponding valid signals. Conditional 5 to 32 address decode 212 selects from the 32 data registers. The data from the data registers selected by conditional 5 to 32 address decode 212 is read from RF core 214 which reads the 32 bits from each accessed data register. This data is supplied to the requesting execution unit groups A, S, C, M, D and CR. In the register write operation, FIG. 9 shows receipt of the write addresses. The 5 to 32 address predecode 216 selects from the 32 data registers. Predication condition data from the instructions supplies predication predecode 218. Write kill unit 220 compares the predication condition data with the contents of predication registers 222. Write arbitration 224 is responsive a WRITE_VALID signal from write kill unit 220 to permit data write. Data write is prohibited upon the absence of the WRITE_VALID signal effectively nulling the instruction. Predicated operation is further described below. The output of write arbitration 224 selects the write registers for write to RF core 226. The data for the register write comes from the execution unit groups A, S, C, M, D and CR. Data may also be written to predication registers 222. FIG. 9 also illustrates a path for exchange of predication data with datapath B 70 used when the destination register and the predication register are in differing datapaths.

Figure 10:
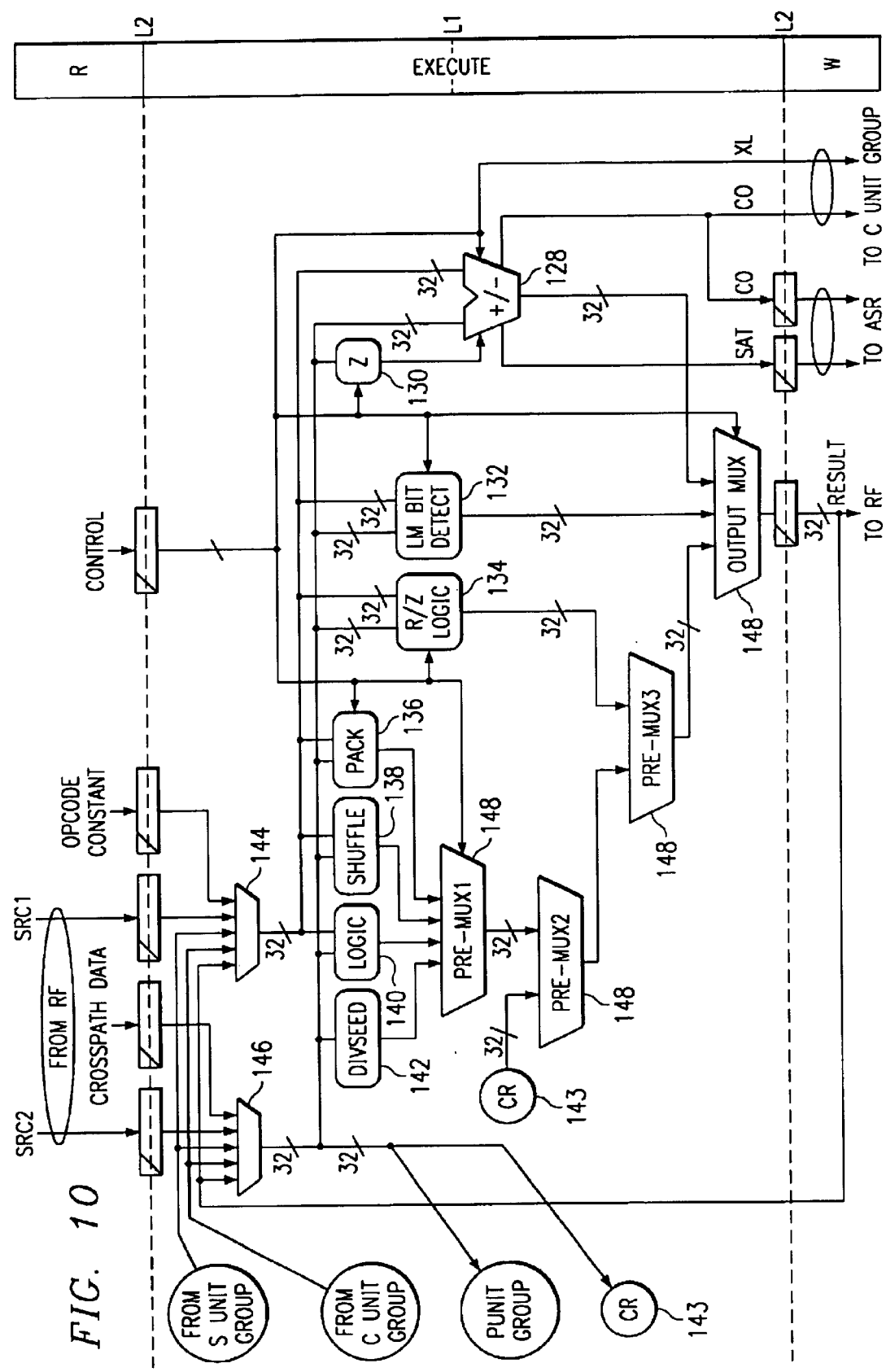
FIG. 10 is a block diagram of an A execution unit group of the DSP core of FIG. 2.

FIG. 10 is a top level block diagram of A unit group 78, which supports a portion of the arithmetic and logic operations of DSP core 44. A unit group 78 handles a variety of operation types requiring a number of functional units including A adder unit 128, A zero detect unit 130, A bit detection unit 132, A R/Z logic unit 134, A pack/replicate unit 136, A shuffle unit 138, A generic logic block unit 140, and A div-seed unit 142. Partitioning of the functional sub-units is based on the functional requirements of A unit group 78, emphasizing maximum performance while still achieving low power goals. There are two input muxes 144 and 146 for the input operands, both of which allow routing of operands from one of five sources. Both muxes have three hotpath sources from the A, C and S result busses, and a direct input from register file 76 in the primary datapath. In addition, src1 mux 144 can pass constant data from decode unit 62, while src2 mux 146 provides a path for operands from the opposite datapath. Result mux 148 is split into four levels. Simple operations which complete early in the clock cycle are pre-muxed in order to reduce loading on the critical final output mux. A unit group 78 is also responsible for handling control register operations 143. Although no hardware is required, these operations borrow the read and write ports of A unit group 78 for routing data. The src2 read port is used to route data from register file 76 to valid configuration registers. Similarly, the write port is borrowed to route configuration register data to register file 76.

Figure 11:
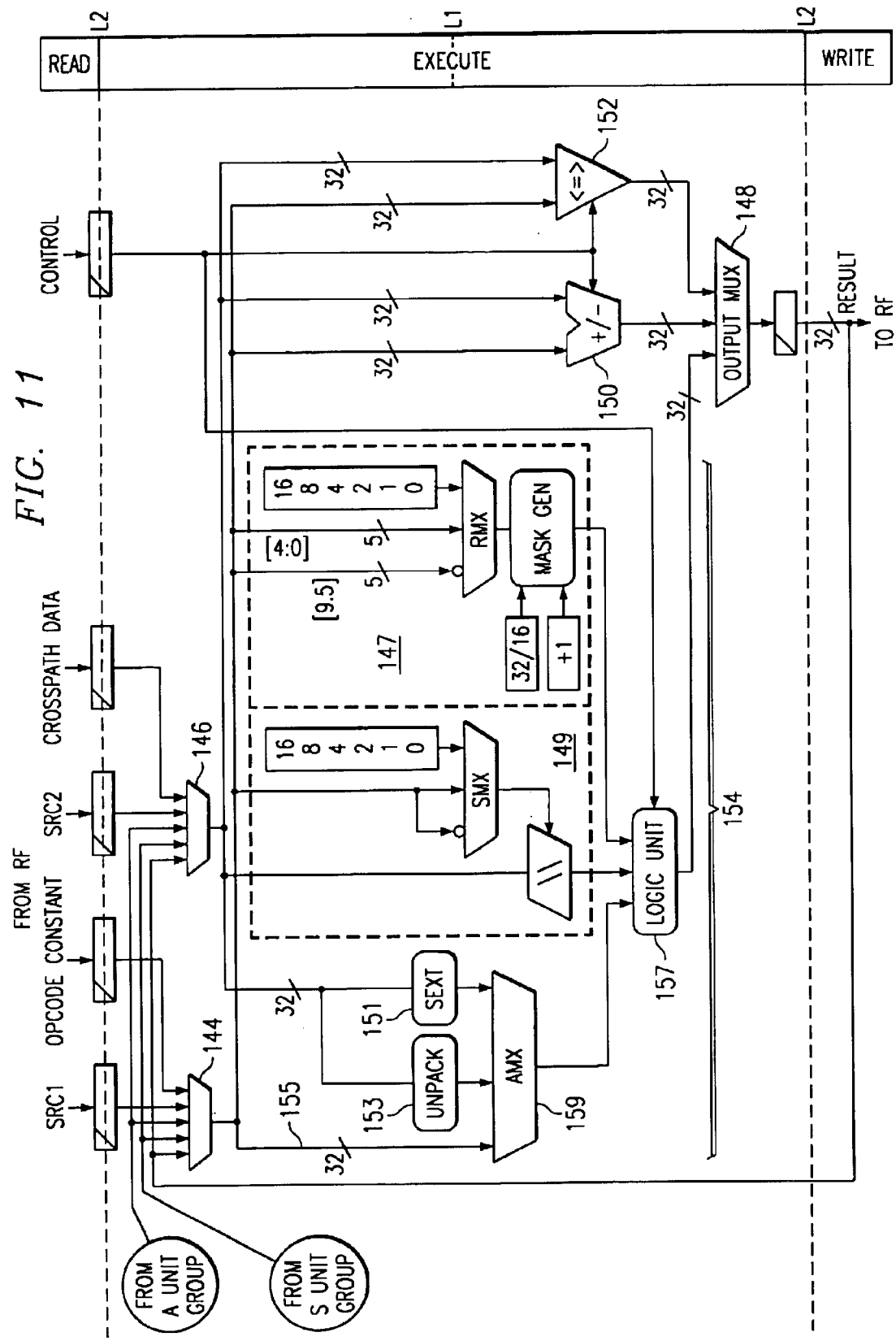
FIG. 11 is a block diagram of a C execution unit group of the DSP core of FIG. 2.

FIG. 11 is a top level block diagram of C unit group 80, which executes a subset of the arithmetic and logical operations of DSP core 44. Src1 input mux 144 and src2 input mux 146 perform the same functions as the input muxes in A unit group 78. C unit group 80 has three major functional units: C adder unit 150, C comparator unit 152 and C rotate/Boolean unit 154. C rotate/Boolean functional unit 154 includes C mask generator unit 147, C shifter unit 149, C sign-extension unit 151, C unpack unit 153, C move unit 155 and C logical unit 157. Like A unit group 78, the functional units of S unit group 80 are efficiently partitioned to achieve maximum performance while minimizing the power and area requirements. C Amx mux 159 selects an output from sign-extension unit 151, C unpack unit 153 or C move unit 155 for forwarding to C logical unit 157. Outputs from C mask generator unit 147 and C shifter unit 149 are also forwarded to C logical unit 157. Finally, result mux 148 selects an output from one of the three major functional units, C adder unit 150, C comparator unit 152 and C rotate/Boolean unit 154, for forwarding to register file 76.

Figure 12:
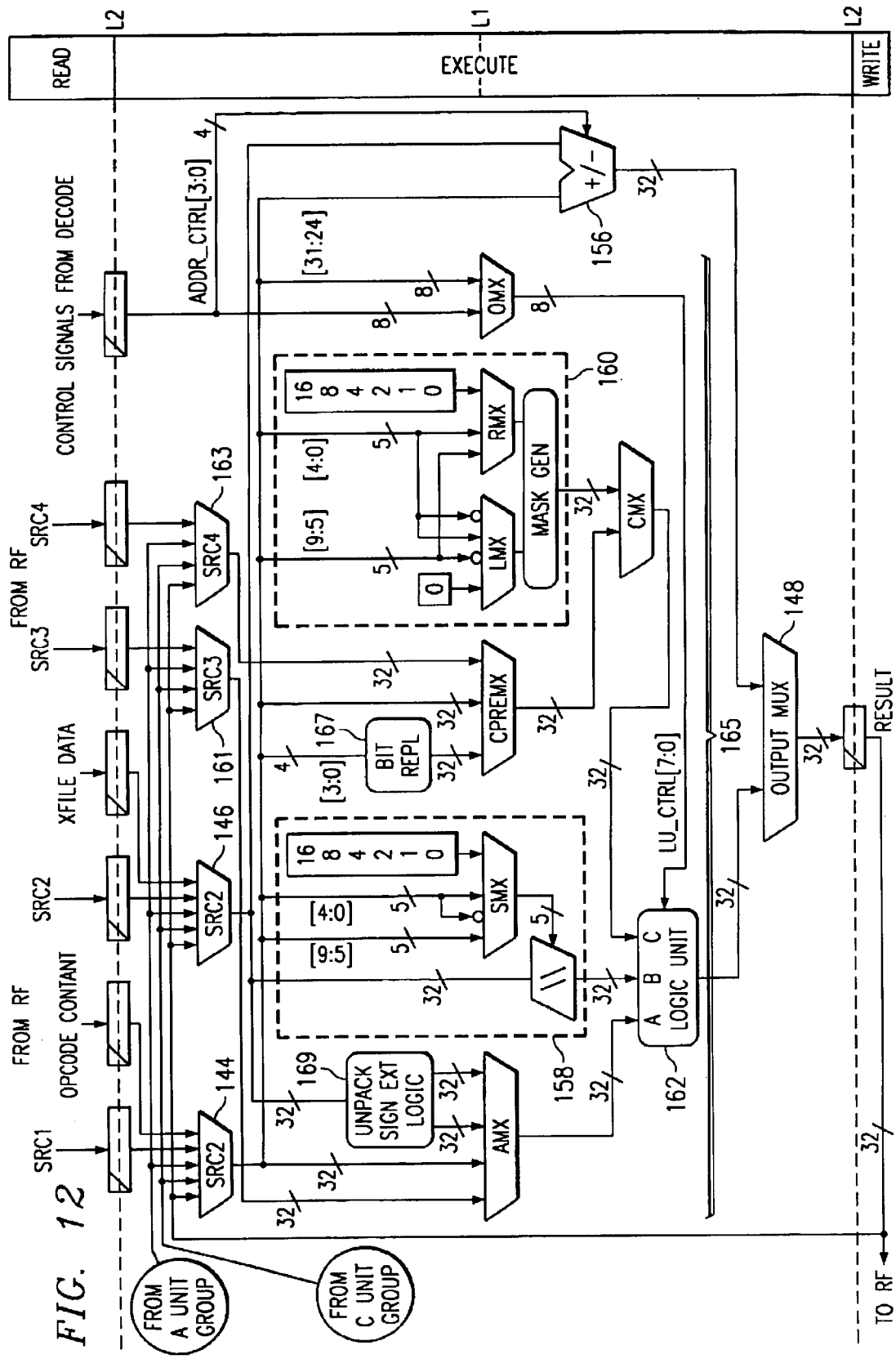
FIG. 12 is a block diagram of a S execution unit group of the DSP core of FIG. 2.

FIG. 12 is a top level block diagram of S unit group 82, which is optimized to handle shifting, rotating, and Boolean operations, although hardware is available for a limited set of add and subtract operations. S unit group 82 is unique in that most of the hardware can be directly controlled by the programmer. S unit group 82 has two more read ports than the A and C unit groups, thus permitting instructions to operate on up to four source registers, selected through input muxes 144, 146, 161, and 163. Similar to the A and C unit groups, the primary execution functionality is performed in the Execute cycle of the design. S unit group 82 has two major functional units: 32-bit S adder unit 156, and S rotate/Boolean unit 165. S rotate/Boolean unit 165 includes S rotator unit 158, S mask generator unit 160, S bit replicate unit 167, S unpack/sign extend unit 169, and S logical unit 162. The outputs from S rotator unit 158, S mask generator unit 160, S bit replicate unit 167, and S unpack/sign extend unit 169 are forwarded to S logical unit 162. The various functional units that make up S rotate/Boolean unit 165 can be utilized in combination to make S unit group 82 capable of handling very complex Boolean operations. Finally, result mux 148 selects an output from one of the two major functional units, S adder unit 156 and S rotate/Boolean unit 165, for forwarding to register file 76.

Figure 13:
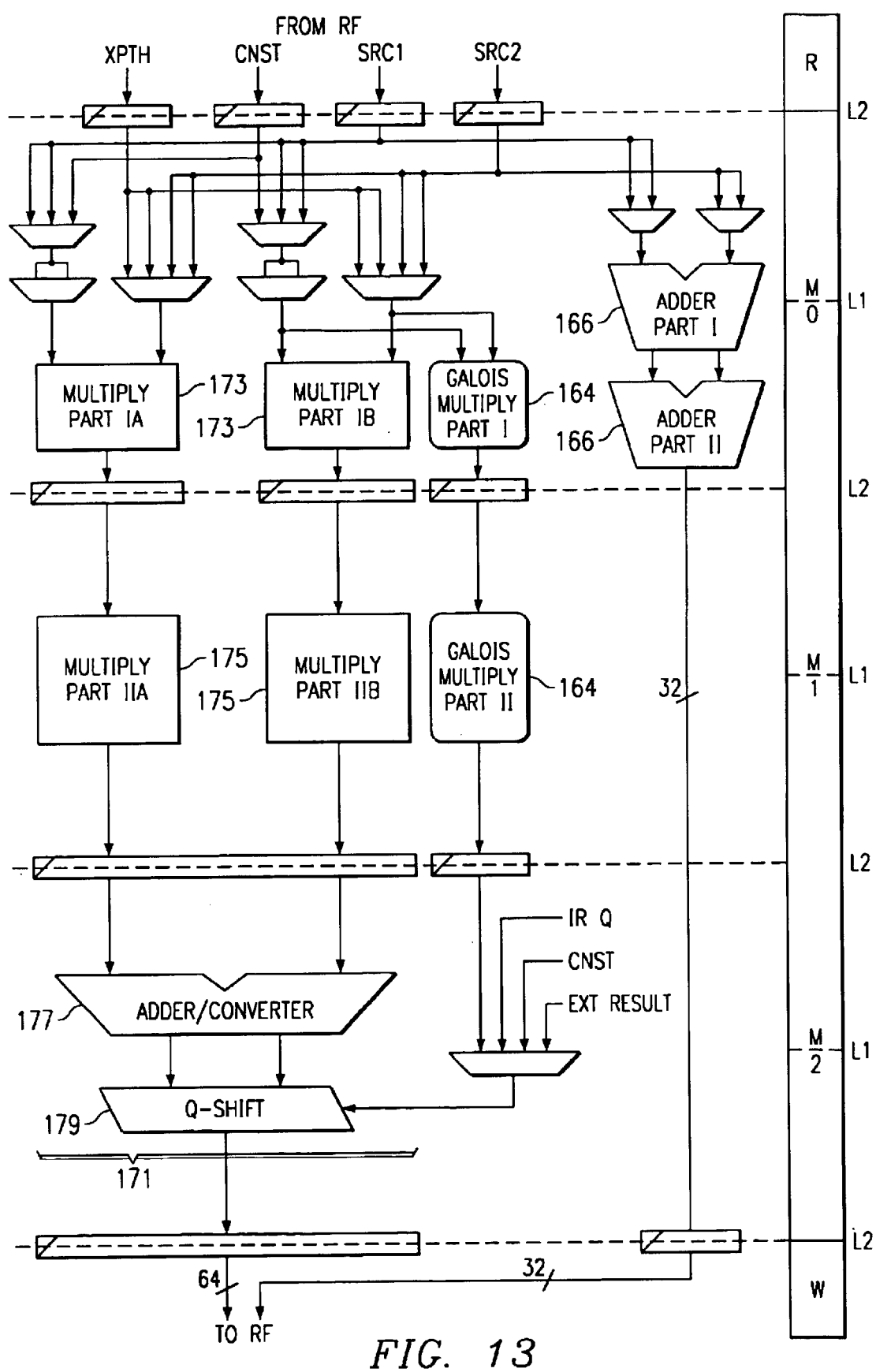
FIG. 13 is a block diagram of an M execution unit group of the DSP core of FIG. 2.

FIG. 13 is a top level block diagram of M unit group 84, which is optimized to handle multiplication, although hardware is available for a limited set of add and subtract operations. M unit group 84 has three major functional units: M Galois multiply unit 164, M adder unit 166 and M multiply unit 171. While M adder unit 166 can complete its operations within the Execute cycle, the other two units require two additional cycles to complete the multiply operations. In general, M multiply unit 171 can perform the following operations: two 16×16 multiplies or four 8×8 multiplies with all combination of signed or unsigned numbers, Q-shifting and A-shifting of multiply results, rounding for extended multiply (EMPY) instructions, controlling the carry chain by breaking/joining the carry chain at 16-bit block boundaries, and saturation multiplication where the final result is shifted left by 1 or returns 0x7FFFFFFF if an overflow occurs. Multiplication is broken down into three stages, starting with Multiply Parts IA & IB 173, which provide the inputs for Multiply Parts IIA & B 175, followed by the final stage which contains Adder/Converter 177 and Q-shift 179. M Galois multiply unit 164 performs Galois multiply in parallel with M multiply unit 171. For output from M unit group 84, the Galois multiply result is muxed with the M multiply result. M adder unit 166 is only lightly coupled to the other units in M unit group 84: it shares read port, but has a dedicated write port, making it possible for both a multiply and an add instruction to write results in the same cycle from M unit group 84.

Figure 14:
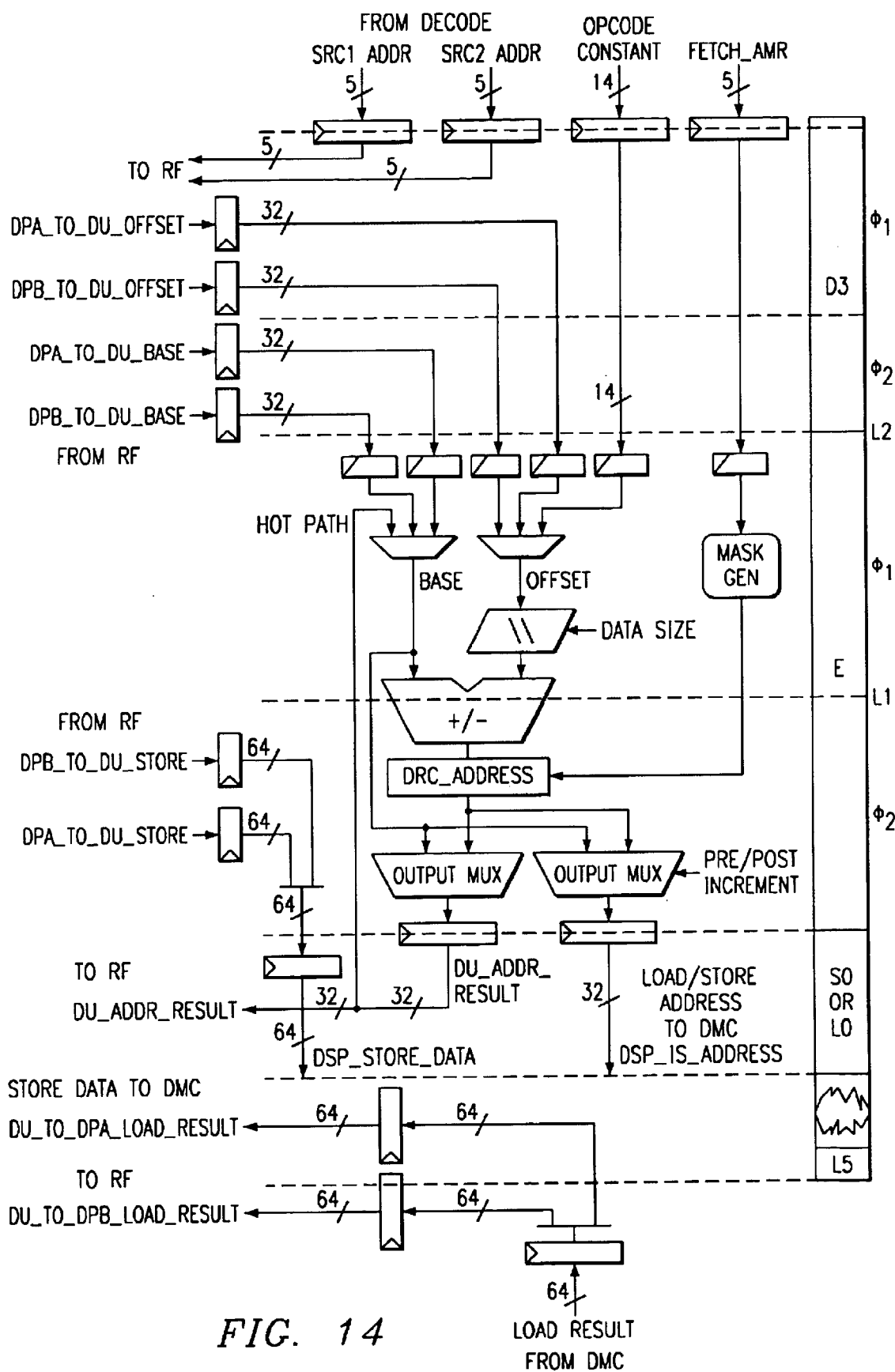
FIG. 14 is a block diagram of the D execution unit group of the DSP core of FIG. 2.

FIG. 14 is a top level block diagram of D group unit 72, which executes the load/store instructions and performs address calculations. D unit group 72 is shared between the two datapaths A 68 and B 70, and can reference the register files 76 of both datapaths. D unit group 72 also interfaces with Data Memory Controller 48. Load and Store instructions operate on data sizes from 8 bits to 64 bits. The different addressing modes supported by D unit group 72 are basic addressing, offset addressing, indexed addressing, auto-increment/auto-decrement, long immediate addressing, and circular addressing. In basic addressing mode, the content of a register is used as a memory address. In offset addressing mode, the memory address is determined by two values, a base value and an offset that is either added or subtracted from the base. The base value always comes from an address register, whereas the offset value may come from either an address register or a 5-bit unsigned constant contained in the instruction. Index addressing mode functions the same as offset addressing mode, except that the offset is interpreted as an index into a table of bytes, half-words, words or double-words, as indicated by the data size of the load or store operation. In auto-increment/decrement addressing mode, the base register is incremented/decremented after the execution of the load/store instruction. There are two sub-modes, pre-increment/decrement, where the new value in the base register is used as the load/store address, and post-increment/decrement where the original value in the register is used as the load/store address. In long-immediate addressing mode, a 14-bit unsigned constant is added to a base register to determine the memory address. In circular addressing mode, the base register along with a block size define a region in memory. To access a memory location in that region, an new index value is generated from the original index modulo the block size.

The address calculation for load/store operations is performed during the Execute stage of the pipeline, and the address write-back occurs in the phase1 of the next clock cycle. The newly calculated address value is also forwarded using a hot path, back to phase1 of E stage, which allows zero delay slot execution for back to back address calculations. The load/store address is calculated and passed onto DMC 48 after pipeline stage E. Results of a load are available from DMC 48 after 6 cycles in pipeline stage L5. The load operation has six delay slots. Data for store is supplied to DMC 48 in pipeline stage S0 along with the calculated address for the store location. FIG. 14 illustrates the different interconnections to register file 76 for fetching the operands from the two datapaths A 68 and B 70, getting the data for the store, and sending the results of address calculations and load operations to both datapaths. FIG. 14 approximately shows the relative pipeline stages during which the address results are computed and load/store data is received and sent, respectively.

FIG. 15 is a chart of the basic assembly format for DSP core 44 instructions, along with examples for each functional unit group. The '||' notation is used in optimized/scheduled assembly to indicate that an instruction is scheduled in the same execute packet with the preceding instruction(s). For example, in the following sequence, instructions (1) through (6) are scheduled in the same execute packet, and should execute simultaneously, although all six instructions will not complete at the same time.

|   | | |
|---|---|---|
|   | ADD .A1 A1,A2,A3 | ;(1) |
| \|\| | SUB .C1 A4,A5,A6 | ;(2) |
| \|\| | SHL .S1 A7,A8,A9 | ;(3) |
| \|\| | MPY .M1 A10,A11,A12 | ;(4) |
| \|\| | ADD .A2 B1,B2,B3 | ;(5) |
| \|\| | MPY .M2 B4,B5,B6 | ;(6)  Instructions (1), (2), ;(3), (4), (5), (6) may be ;scheduled in the same execute ;packet |
|   | SUB .A2 B3,B2,B1 | ;(7)  Instruction (7) must be ;scheduled in the next execute ;packet because it reuses unit ;group A2 |

All instructions can be predicated (conditionally executed) on the value of a predication register. Assembly examples using the [predication reg] notation follow:

| | | |
|---|---|---|
| [A0] ADD .A1 A1,A2,A3 | | ;execute the ADD instruction ;if A0 is non-zero |
| [!A0]ADD .C2 B7,B8,B9 | | ;execute the ADD instruction ;if A0 is zero |

Because several instructions such as ADD or SUB are available in more than one unit group, the '.unit' notation is recommended when the programmer specifically wants to direct an instruction to a particular unit group. If the '.unit' notation is omitted, the compiler or assembler will automatically assign instructions to appropriate unit groups. Load, store and address instructions are only available in D-unit group 72, therefore the .D specification is redundant and optional. For the same reason, the .P specification is redundant for branch instructions in P-unit group 74.

The 'datapath' notation is also redundant and optional because the destination register implicitly specifies the datapath (note that for store instructions, the source register specifies the datapath). The 'crosspath' notation is used to indicate that one of the source operands (generally, op1 for the shift and bit-field instructions, op2 for all others; unary instructions may also use the crosspath on their operand) comes from the other datapath's register file via the crosspath.

Generally, one important aspect of designing a microprocessor architecture is providing both efficient data storage and fast data processing. In a typical data processing system, data is stored in memory until it is needed, at which point it is loaded into the CPU's registers for processing. There can be a tradeoff between storage efficiency and quickly providing the data in a convenient form to the CPU for processing. There is usually not a problem when the storage size of a memory location is the same as the size of the data to be operated upon. For example, if data is coded into 32-bit words, and the storage size of a memory location is 32-bits, a single load from memory loads the data into a data register in processable form. The same principle generally applies when the size of the data is a multiple of the size of a memory location. For example, a 64-bit double word stored in two memory locations can be loaded into two data registers ready for processing. Additionally, in both of these examples there is no unused memory space.

Inefficiency can arise when the bit length of one data element is less than the storage size of a memory location. Storing one such data element per memory location leaves unused space in that memory location. For example, if the data is formatted in half-words (16-bits) or bytes (8-bits), then half of the space of a memory location is left unutilized when storing a half-word, and three-quarters is left unutilized when storing a byte. The data can be directly loaded into a register in a form ready for processing, but the memory space is used inefficiently.

An alternative approach is to pack more than one of the data elements into one word which is the size of a memory location. For example, two half-words or four bytes can fit into one 32-bit memory location, thus more efficiently utilizing the memory space. The tradeoff with this approach is that the CPU must take the time and processing power to concatenate the data into a register before the packed word can be stored to memory. The CPU must again expend its resources to unpack the data when the packed data word is subsequently loaded from memory to a register for further processing.

According to the present invention, both memory storage space and CPU resources can be utilized efficiently when working with packed data if the packing and unpacking of the data occurs during the register store and load operations, respectively, through the use of new processor instructions. In this manner, a single store or load instruction can perform all of the tasks that used to take several instructions, while at the same time conserving memory space. One load instruction can retrieve data from memory and unpack it into two or more registers in a format that is ready for immediate processing. Similarly, immediately after data has been processed and put into two or more registers, one store instruction can pack the data from those registers and save it to memory in a more efficient format. The present invention also permits the order of the data to be rearranged if desired, for example by interleaving bytes or half-words as they are packed or unpacked.

FIGS. 16-19 are charts describing register store and load instructions. The charts in these figures have three columns: Mnemonic, Action, and Operation. Under the Mnemonic heading are listed the mnemonics for the various load and store instructions. An instruction mnemonic followed by a [U] indicates that the instruction can provide either a sign extend or zero extend function. If the instruction is the unsigned (U) version, then data is loaded into a register with zeros extended into the unloaded upper bits. If the instruction is the signed (no U) version, then the data is loaded into a register with the sign bit extended through the unloaded upper bits. Under the Action heading in the charts, a brief description is given of the function performed by the respective instruction. In this column, the abbreviation LS stands for least significant. Under the Operation heading, a more detailed illustration is given of the function performed by the respective instruction. In the Operation column, A, B, O and E represent data registers. A is a register in register file 76 in datapath A 68 of FIG. 2, and B is a register in register file 76 in datapath B 70 of FIG. 2. O and E are an odd and even register pair in the same register file in either datapath A 68 or B 70. Each character shown in a memory location or in a data register represents a 4-bit nibble, with eight of the characters constituting a 32-bit word. An X represents don't care bits and an S represents sign extended bits.

FIG. 16 illustrates several standard load instructions, each for loading data of a different size from memory to one or more registers. LDB[U] 168 loads an 8-bit byte-aligned quantity from memory to the low 8-bits of a register. LDH[U] 170 loads a 16-bit byte-aligned quantity from memory to the low 16-bits of a register. In both these instructions, the quantity is zero extended to 32-bits before it is written to the data register if U is specified, and the quantity is sign extended to 32-bits before it is written to the data register if U is not specified. LDW 172 loads a 32-bit byte-aligned quantity from memory into a register, and LDD 174 loads a 64-bit byte-aligned quantity from memory into two registers. The two destination registers are either an odd/even pair in the same register file, or they are the same numbered register in both register files. Of the odd/even pair, the even register will receive the least significant word of data, and of the A/B pair, the A register will receive the least significant word of data. Examples of these instructions are given below:

```
LDB: mem(00001000) == 01efcdab      ;memory before
                                     operation
     A0 == 0x00001000
     LDB .D *A0,A1
```

-continued

```
     A1 <== 0xffffffab              ;or 0x000000ab for
                                     ;unsigned version
LDH: mem(00001000) == 01efcdab      ;memory before
                                     operation
     A0 == 0x00001000
     LDH .D *A0,A1
     A1 <== 0xffffcdab              ;or 0x0000cdab for
                                     ;unsigned version
LDW: mem(00001000) == 01efcdab      ;memory before
     operation
     A0 == 0x00001000
     LDW .D *A0,A1
     A1 <== 0x01efcdab
LDD: mem(00001000) == 01efcdab 67452301 ;most significant
                                         ;word is shown first
     A0 == 0x00001000
     LDD .D *A0,A3:A2
     A3 <== 0x01efcdab
     A2 <== 0x67452301
```

FIG. 17 illustrates four standard store instructions, each for storing data of a different size from one or more registers to memory. These instructions perform essentially the opposite function of the four load instructions in FIG. 16. STB 176 stores the low 8 bits of a 32-bit register to a byte-aligned location in memory, and STH 178 stores the low 16 bits of a 32-bit register to a byte-aligned location in memory. STW 180 stores the contents of a 32-bit register to a byte aligned location in memory, and STD 182 stores 64 bits from two registers to a byte-aligned location in memory. The two source registers are either an odd/even pair in the same register file, or they are the same numbered register in both register files. Of the odd/even pair, the even register contains the data destined for the lowest address, and of the A/B pair, the A register contains the data destined for the lowest address. Examples of these instructions are given below:

```
STB: mem(00001000) == 01efcdab      ;memory before
                                     operation
     A1 == 0x3412cdab
     A0 == 0x00001000
     STB .D A1, *A0
     mem(00001000) == 000000ab      ;memory before
                                     operation
STH: mem(00001000) == 00000000      ;memory before
                                     operation
     A1 == 0x3412cdab
     A0 == 0x00001000
     STB .D A1, *A0
     mem(00001000) == 0000cdab      ;memory before
                                     operation
STW: mem(00001000) == 00000000      ;memory before
                                     operation
     A1 == 0x3412cdab
     A0 == 0x00001000
     STW .D A1, *A0
     mem(00001000) == 3412cdab      ;memory before
                                     operation
STD: mem(00001000) == 00000000 00000000 ;most significant
                                         ;word is shown first
     A3 == 0x89674523
     A2 == 0x3412cdab
     A0 == 0x00001000
     STD .D A3:A2,*A0
     mem(00001000) == 89674523 3412cdab ;memory after
                                         ;operation
```

FIG. 18 illustrates several instructions for retrieving packed data from memory and parsing it into multiple data registers. All of these instructions can either zero extend (U specified) or sign extend (no U specified) the data segments which are loaded into the registers. LDW_BH[U] 184 retrieves a four byte byte-aligned quantity from memory and loads the bytes into the low 8-bits of each of the four half-words in two registers. The two registers are either an odd/even pair or an A/B pair, similar to those described above with respect to LDD instruction 174. LDW_BHI[U] 186 retrieves a four byte byte-aligned quantity from memory and interleaves the bytes as it loads them into the low 8-bits of each of the four half-words in two registers, either an odd/even pair or an A/B pair. LDW_HW[U] 188 retrieves a two half-word byte-aligned quantity from memory and loads the half-words into the low 16-bits of two registers, either an odd/even pair or an A/B pair.

LDD_BH[U] 190 retrieves an eight byte (64-bit) byte-aligned quantity from memory and unpacks the bytes into the low 8-bits of each of the eight half-words in four data registers. An odd/even pair of registers in each of the two registers files 76 make up the four registers, and the two pair of registers have the same relative register numbers in the two register files. The AE register receives the least significant bytes of data, followed by the AO register, the BE register, and finally the BO register receives the most significant bytes of data. LDD_BHI[U] 192 retrieves an eight byte (64-bit) byte-aligned quantity from memory and interleaves the bytes as it unpacks them into the low 8-bits of each of the eight half-words in four data registers. Except for the interleaving, the register loading is like that of the LDD_BH[U] instruction 190.

LDD_HW[U] 194 retrieves a four half-word (64-bit) byte-aligned quantity from memory and unpacks the half-words into the low 16-bits of each of four data registers. An odd/even pair of registers in each of the two registers files 76 make up the four registers, and the two pair of registers have the same relative register numbers in the two register files. The AE register receives the least significant half-word of data, followed by the AO register, the BE register, and finally the BO register receives the most significant half-word of data. LDD_HWI[U] 196 retrieves a four half-word byte-aligned quantity from memory and interleaves the half-words as it loads them into the low 16-bits of each of four data registers. Except for the interleaving, the register loading is like that of the LDD_HW[U] instruction 194. Examples of these instructions are given below:

```
LDW_BH:    mem(00001000) == 01efcdab           ;memory before
                                                ;operation
    A0 == 0x00001000
    LDW_BH .D *A0,B1:A1
    B1 <== 0x0001ffef                          ;or 0x000100ef
                                                and
    A1 <== 0xffcdffab                          ;0x00cd00ab for
                                                ;unsigned version
LDW_BHI:   mem(00001000) == 01efcdab           ;memory before
                                                ;operation
    A0 == 0x00001000
    LDW_BHI .D *A0,B3:B2
    B3 <== 0x0001ffcd                          ;or 0x000100cd
                                                and
    B2 <== 0xffefffab                          ;0x00ef00ab for
                                                ;unsigned version
LDW_HW:    mem(00001000) == 01efcdab           ;memory before
                                                ;operation
    A0 == 0x00001000
    LDW_HW .D *A0,B1:A1
    B1 <== 0x000001ef                          ;or 0x000001ef
                                                and
    A1 <== 0xffffcdab                          ;0x00cd00ab for
                                                ;unsigned version
```

-continued

```
LDD_BH:    mem(00001000) == 01efcdab 67452301  ;memory before
                                                operation
    A0 == 0x00001000
    LDD_BH .D *A0,B3:A3
    B3 <== 0x0001ffef                          ;or 0x000100ef,
    B2 <== 0xffcdffab                          ;0x00cd00ab,
    A3 <== 0x00670045                          ;0x00670045, and
    A2 <== 0x00230001                          ;0x00230001 for
                                                ;unsigned version
LDD_BHI:   mem(00001000) == 01efcdab 67452301  ;memory before
                                                ;operation
    A0 == 0x00001000
    LDD_BHI .D *A0,B3:A3
    B3 <== 0x0001ffcd                          ;or 0x000100cd,
    B2 <== 0xffefffab                          ;0x00ef00ab,
    A3 <== 0x00670023                          ;0x00670023, and
    A2 <== 0x00450001                          ;0x00450001 for
                                                ;unsigned version
LDD_HW:    mem(00001000) == 01efcdab 67452301  ;memory before
                                                ; operation
    A0 == 0x00001000
    LDD_HW .D *A0,B3:A3
    B3 <== 0x000001ef                          ;or 0x000001ef,
    B2 <== 0xffffcdab                          ;0x0000cdab,
    A3 <== 0x00006745                          ;0x00006745, and
    A2 <== 0x00002301                          ;0x00002301 for
                                                ;unsigned version
LDD_HWI:   mem(00001000) ==                    ;memory before
01efcdab 67452301                              ;operation
    A0 == 0x00001000
    LDD_HWI .D *A0,B3:A3
    B3 <== 0x000001ef                          ;or 0x00001ef,
    B2 <== 0x00006745                          ;0x00006745,
    A3 <== 0xffffcdba                          ;0x0000cdba, and
    A2 <== 0x00002301                          ;0x00002301 for
                                                ;unsigned version
```

FIG. 19 illustrates several instructions for concatenating data from multiple data registers and storing it to memory. There is no saturation when packing the data. STBH_W 198 packs the low 8 bits of the four half-words in two data registers and stores the data to a byte-aligned location in memory. The two registers are either an odd/even pair or an A/B pair, similar to those described above with respect to STD instruction 182. STBHI_W 200 interleaves and packs the low 8 bits of the four half-words in two data registers and stores the data to a byte-aligned location in memory. The two registers are either an odd/even pair or an A/B pair. STHW_W 202 packs the low 16 bits of two data registers and stores the data to a byte-aligned location in memory. The two registers are either an odd/even pair or an A/B pair.

STBH_D 204 packs the low 8 bits of the eight half-words in four data registers and stores the data to a byte-aligned location in memory. An odd/even pair of registers in each of the two registers files 76 make up the four registers, and the two pair of registers have the same relative register numbers in the two register files. The AE register contains the least significant bytes of data, followed by the AO register, the BE register, and finally the BO register contains the most significant bytes of data. STBHI_D 206 interleaves and packs the low 8 bits of the eight half-words in four data registers and stores the data to a byte-aligned location in memory. Except for the interleaving, the data packing is like that of the STBH_D instruction 204.

STHW_D 208 packs the low 16 bits of four data registers and stores the data to a byte-aligned location in memory. An odd/even pair of registers in each of the two registers files 76 make up the four registers, and the two pair of registers have the same relative register numbers in the two register files. The AE register contains the least significant half-word of data, followed by the AO register, the BE register, and finally the B0 register contains the most significant half-word of data. STHWI_D 210 interleaves and packs the low 16 bits of four data registers and stores the data to a byte-aligned location in memory. Except for the interleaving, the data packing is like that of the STHW_D instruction 208.

```
STBH_W:   mem(00001000) == 00000000              ;memory before
                                                 ;operation
  B1 == 0xef12cdab
  A1 == 0x67450001
  STBH_W .D B1:A1,*A0
  mem(00001000) == 12ab4501                      ;memory after
                                                 ;operation
STBHI_W:  mem(00001000) == 000000000             ;memory before
                                                 ;operation
  A3 == 0xef12cdab
  A2 == 0x67450001
  STBHI_W .D A3:A2,*A0
  mem(00001000) == 1245ab01                      ;memory after
                                                 ;operation
STHW_W:   mem(00001000) == 00000000              ;memory before
                                                 ;operation
  B1 == 0xef12cdab
  A1 == 0x67450001
  STHW_W .D B1:A1,*A0
  mem(00001000) == cdab0001                      ;memory after
                                                 ;operation
STBH_D:   mem(00001000) == 00000000 00000000     ;memory before
                                                 ;operation
  B3 == 0xef12cdab
  B2 == 0xe89170023
  A3 == 0x6745001
  A2 == 0x98675309
  STBH_D .D B3:A3,*A0
  mem(00001000) == 12ab1723 45016709             ;memory after
                                                 ;operation
STBHI_D:  mem(00001000) == 00000000 00000000     ;memory before
                                                 ;operation
  B3 == 0xef12cdab
  B2 == 0xe89170023
  A3 == 0x6745001
  A2 == 0x98675309
STBHI_D .D B3:A3,*A0
mem(00001000) == 1217ab23 45670109               ;memory after
                                                 ;operation
STHW_D:   mem(00001000) == 00000000 00000000     ;memory before
                                                 ;operation
  B3 == 0xef12cdab
  B2 == 0xe89170023
  A3 == 0x6745001
  A2 == 0x98675309
  STHW_D .D B3:A3,*A0
  mem(00001000) == cdab0023 50015309             ;memory after
                                                 ;operation
STHWI_D:  mem(00001000) ==                       ;memory before
00000000 00000000                                ;operation
  B3 == 0xef12cdab
  B2 == 0xe89170023
  A3 == 0x6745001
  A2 == 0x98675309
  STHWI_D .D B3:A3,*A0
  mem(00001000) == cdab5001 00235309             ;memory after
                                                 ;operation
```

The inventive concepts used in the above examples may easily be applied to other types of processors with different architectures, different word sizes, etc. For example, a processor may have only one register file, or may have an 8, 16, 64-bit, etc. word size, in which case modified versions of the above instructions could be used. As another example, if 4-bit nibbles are needed as a data format for processing, then modified versions of the above instructions that packed and unpacked nibbles could be implemented. As another example, there may be useful ways of rearranging the data as it is packed or unpacked other than interleaving, and these are within the scope of the inventive concepts. Again, the same principle of efficiently packing register data while storing it to memory and unpacking it while loading it into registers using single instructions applies just as readily to other processor architectures.

Several example systems which can benefit from aspects of the present invention are described in U.S. Pat. No. 5,072,418, in particular with reference to FIGS. 2-18 of U.S. Pat. No. 5,072,418. A microprocessor incorporating an embodiment of the present invention to improve performance or reduce cost may be used to further improve the systems described in U.S. Pat. No. 5,072,418. Such systems include, but are not limited to, video imaging systems, industrial process control, automotive vehicle safety systems, motor controls, robotic control systems, satellite telecommunications systems, echo canceling systems, modems, speech recognition systems, vocoder-modem systems with encryption, and such.

As used herein, the terms "applied," "connected," "connecting," and connection" mean electrically connected, including where additional elements may be in the electrical connection path. As used herein, the term "microprocessor" is intended to encompass "microcomputers," which generally are microprocessors with on-chip Read Only Memory (ROM). As these terms are often used interchangeably in the art, it is understood that the use of one or the other of these terms herein should not be considered as restrictive as to the features of this invention.

Various specific circuit elements well known in the art may be used to implement the detailed circuitry of the preferred embodiments, and all such alternatives are comprehended by the invention. For example, data storage elements such as registers may be implemented using any suitable storage device, such as a latches, flip-flops, FIF0s, memory addresses, or RAM cells. Depending on the particular configuration of a design, a bus may consist of one or more individual lines or buses. Muxes may be implemented using any suitable circuit element, such as logic circuits, tri-state circuits, or transmission gate circuits. Some circuits may be implemented as structurally separate from other circuits, or may be implemented in combination with other circuits.

An alternative embodiment of the novel aspects of the present invention may include other circuitries which are combined with the circuitries disclosed herein in order to reduce the total gate count of the combined functions. Because those skilled in the art are aware of techniques for gate minimization, the details of such an embodiment are not described herein.

Although the invention has been described with reference to a specific processor architecture, it is recognized that one of ordinary skill in the art can readily adapt the described embodiments to operate on other processors. Depending on the specific implementation, positive logic, negative logic, or a combination of both may be used. Also, it should be understood that various embodiments of the invention can alternatively employ hardware, software, microcoded firmware, or combinations of each, yet still fall within the scope of the claims. Process diagrams for hardware are also representative of flow diagrams for microcoded and software-based embodiments. Thus the invention is practical across a spectrum of software, firmware and hardware.

Finally, while this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A data processing system comprising:
   a memory comprising a plurality of memory locations; and
   a central processing unit core comprising at least one register file with a plurality of registers, said core connected to said memory for loading data from and storing data to said memory locations, said core responsive to a load instruction to retrieve data words from said memory and parse said data words over selected parts of two data registers in said at least one register file, said parse comprising interleaved unpacking the lower and higher half-words of each of said two data words into corresponding pairs of data registers.

2. The data processing system of claim 1 wherein said load instruction selects sign or zero extend for the parsed data in said at least two data registers.

3. The data processing system of claim 1 wherein said at least one register file is two register files, and one pair of said corresponding pairs of data registers is located in one register file and the other pair is located in the other register file.

4. A data processing system comprising:
   a memory comprising a plurality of memory locations; and
   a central processing unit core comprising at least one register file with a plurality of registers, said core connected to said memory for loading data from and storing data to said memory locations, said core responsive to a load instruction to retrieve data words from said memory and parse said data words over selected parts of two data registers in said at least one register file, said parse comprising unpacking the bytes of each at least one data word into the lower and higher half-words of each of a pair of data registers.

5. The data processing system of claim 4 wherein said at least one data word is two data words, and said parse comprises unpacking eight bytes from said two data words into corresponding pairs of data registers.

6. The data processing system of claim 5 wherein said unpacking of said bytes of said data words is interleaved.

7. The data processing system of claim 6 wherein said at least one register file is two register files, and one pair of said corresponding pairs of data registers is located in one register file and the other pair is located in the other register file.

8. The data processing system of claim 4 wherein said at least one register file is two register files, and said pair of data registers are an even/odd pair in the same data register file.

9. The data processing system of claim 4 wherein said at least one register file is two register files, one of said pair of data registers is located in one register file and the other is located in the other register file, and each of said pair of data registers has the same relative register number.

10. A data processing system comprising:
    a memory comprising a plurality of memory locations; and
    a central processing unit core comprising at least one register file with a plurality of registers, said core connected to said memory for loading data from and storing data to said memory locations, said core responsive to a store instruction to concatenate data from selected parts of two data registers into one data word and save said one data word to said memory, said concatenate packing the lower bytes of the lower and higher half-words of each of said two data registers into said at least one data word.

11. The data processing system of claim 10 wherein said two data registers are an even/odd register pair.

12. A data processing system comprising:
    a memory comprising a plurality of memory locations; and
    a central processing unit core comprising at least one register file with a plurality of registers, said core connected to said memory for loading data from and storing data to said memory locations, said core responsive to a store instruction to concatenate data from selected parts of four data registers into two data words and save said two data words to said memory, said concatenate packing the lower bytes of the lower and higher half-words of each of said four data registers into said two data words.

13. A data processing system comprising:
    a memory comprising a plurality of memory locations; and
    a central processing unit core comprising
    a plurality of A functional units,
    a plurality of B functional units,
    an A register file with a plurality of A registers accessed by corresponding register numbers, each A register capable of serving as a source or destination for any A functional unit,
    a B register file with a plurality of B registers accessed by corresponding register numbers, each B register capable of serving as a source or destination for any B functional unit,
    a first cross path connected to said A register file and said B functional units permitting any one A register file to be a source for at least one B functional unit,
    a second cross path connected to said B register file and said A functional units permitting any one B register file to be a source for at least one A functional unit,
    said core connected to said memory for loading data from and storing data to said memory locations, said core responsive to a load instruction to retrieve at least one data word from said memory and parse said at least one data word over selected parts of two data registers including an A register having a first register access number and a second B register having said first register access number.

14. The data processing system of claim 13, wherein said at least one data word comprises a lower data word and an higher data word, and said parse comprises unpacking said lower data word into said A register and said higher data word into said B data register.

15. The data processing system of claim 13, wherein said at least one data word comprises a single data word, and said parse comprises unpacking first and second bytes of said single data word into corresponding lower and higher half words of said A register and third and fourth bytes of said single data word into corresponding lower and higher half words of said B register.

16. The data processing system of claim 15, wherein said load instruction selects sign or zero extend for the parsed data in said A and B registers.

17. The data processing system of claim 13, wherein said at least one data word comprises a single data word, and said parse comprises unpacking first and third bytes of said single data word into corresponding lower and higher half words of said A register and second and fourth bytes of said single data word into corresponding lower and higher half words of said B register.

18. The data processing system of claim 17, wherein said load instruction selects sign or zero extend for the parsed data in said A and B registers.

19. The data processing system of claim 13, wherein said at least one data word comprises a single data word, and said parse comprises unpacking a lower half word of said single data word into a lower half word of said A register and an higher half word of said single data word into a lower half word of said B register.

20. The data processing system of claim 17, wherein said load instruction selects sign or zero extend for the parsed data in said A and B registers.

21. The data processing system of claim 13, wherein said at least one data word comprises a single data word, and said concatenate comprises packing first and third bytes said A register into a lower half word of said single data word and first and third bytes of said B register into an higher half word of said single data word.

22. The data processing system of claim 13, wherein said parse comprises unpacking a lower half word of a lower data word into a lower half word of said first A register, a higher half word of said lower data word into a lower half word of said second A register, a lower half word of a higher data word into a lower half word of said first B register and a higher half word of said higher data word into a lower half of said second B register.

23. The data processing system of claim 22, wherein said load instruction selects sign or zero extend for the parsed data in said first and second A registers and said first and second B registers.

24. A data processing system comprising:
a memory comprising a plurality of memory locations; and
a central processing unit core comprising
a plurality of A functional units,
a plurality of B functional units,
an A register file with a plurality of A registers accessed by corresponding register numbers, each A register capable of serving as a source or destination for any A functional unit,
a B register file with a plurality of B registers accessed by corresponding register numbers, each B register capable of serving as a source or destination for any B functional unit,
a first cross path connected to said A register file and said B functional units permitting any one A register file to be a source for at least one B functional unit,
a second cross path connected to said B register file and said A functional units permitting any one B register file to be a source for at least one A functional unit,
said core connected to said memory for loading data from and storing data to said memory locations, said core responsive to a store instruction to concatenate data from selected parts of two data registers including an A register having a first register access number and a second B register having said first register access number into at least one data word.

25. The data processing system of claim 24, wherein said at least one data word comprises a lower data word and an higher data word, and said concatenate comprises packing said A register into said lower data word and said B register into said higher data word.

26. The data processing system of claim 24, wherein said at least one data word comprises a single data word, and said concatenate comprises packing a first byte of said A register into a first byte of said single data word, a third byte of said A register into a third byte of said single data word, a first byte of said B register into a second byte of said single data word and a third byte of said B register into a fourth byte of said single data word.

27. The data processing system of claim 24, wherein said at least one data word comprises a single data word, and said concatenate comprises packing a lower half word of said A register into a lower half word of said single data word and a lower half word of said B register into an higher half word of said single data word.

28. A data processing system comprising:
a memory comprising a plurality of memory locations; and
a central processing unit core comprising
a plurality of A functional units,
a plurality of B functional units,
an A register file with a plurality of A registers accessed by corresponding register numbers, each A register capable of serving as a source or destination for any A functional unit,
a B register file with a plurality of B registers accessed by corresponding register numbers, each B register capable of serving as a source or destination for any B functional unit,
a first cross path connected to said A register file and said B functional units permitting any one A register file to be a source for at least one B functional unit,
a second cross path connected to said B register file and said A functional units permitting any one B register file to be a source for at least one A functional unit,
said core connected to said memory for loading data from and storing data to said memory locations, said core responsive to a load instruction to retrieve at two data words from said memory and parse said data words over selected parts of four data registers including a first A register having a first even register access number, a second A register having a second odd register access number one more that said first even register access number, a first B register having said first even register access number, and a second B register having said second odd register access number.

29. The data processing system of claim 28, wherein said parse comprises unpacking a first byte of a lower data word into a lower byte of said first A register, a second byte of said lower data word into a third byte of said first A register, a third byte of said lower data word into a first byte of said second A register, a fourth byte of said lower data word into a third byte of said second A register, a first byte of an higher data word into a first byte of said first B register, a second byte of said higher data word into a third byte of said first B register, a third byte of said higher data word into a first byte of said second B register and a third byte of said higher data word into a third byte of said second B data register.

30. The data processing system of claim 29, wherein said load instruction selects sign or zero extend for the parsed data in said first and second A registers and said first and second B registers.

31. The data processing system of claim 28, wherein said parse comprises unpacking a first byte of a lower data word into a lower byte of said first A register, a third byte of said lower data word into a third byte of said first A register, a second byte of said lower data word into a first byte of said second A register, a fourth byte of said lower data word into a third byte of said second A register, a first byte of an higher data word into a first byte of said first B register, a third byte of said higher data word into a third byte of said first B register, a second byte of said higher data word into a first byte of said second B register and a third byte of said higher data word into a third byte of said second B data register.

32. The data processing system of claim 31, wherein said load instruction selects sign or zero extend for the parsed data in said first and second A registers and said first and second B registers.

33. The data processing system of claim 28, wherein said parse comprises unpacking a lower half word of a lower data word into a lower half word of said first A register, a lower half word of a higher data word into a lower half word of said second A register, a higher half word of said lower data word into a lower half word of said first B register and a higher half word of said higher data word into a lower half of said second B register.

34. The data processing system of claim 33, wherein said load instruction selects sign or zero extend for the parsed data in said first and second A registers and said first and second B registers.

35. A data processing system comprising:
a memory comprising a plurality of memory locations; and
a central processing unit core comprising
a plurality of A functional units,
a plurality of B functional units,
an A register file with a plurality of A registers accessed by corresponding register numbers, each A register capable of serving as a source or destination for any A functional unit,
a B register file with a plurality of B registers accessed by corresponding register numbers, each B register capable of serving as a source or destination for any B functional unit,
a first cross path connected to said A register file and said B functional units permitting any one A register file to be a source for at least one B functional unit,
a second cross path connected to said B register file and said A functional units permitting any one B register file to be a source for at least one A functional unit,
said core connected to said memory for loading data from and storing data to said memory locations, said core responsive to a store instruction to concatenate data from selected parts of four data registers including a first A register having a first even register access number, a second A register having a second odd register access number one more that said first even register access number, a first B register having said first even register access number, and a second B register having said second odd register access number into two data words.

36. The data processing system of claim 35, wherein said concatenate comprises packing a first byte of said first A register into a first byte of a lower data word, a third byte of said first A register into a second byte of said lower data word, a first byte of said second A register into a third byte of said lower data word, a third byte of said second A register into a fourth byte of said lower data word, a first byte of said first B register into a first byte of a higher data word, a third byte of said first B register into a second byte of said higher data word, a first byte of said second B register into a third byte of said higher data word and a third byte of said second B register into a fourth byte of said higher data word.

37. The data processing system of claim 35, wherein said concatenate comprises packing a first byte of said first A register into a first byte of a lower data word, a third byte of said first A register into a third byte of said lower data word, a first byte of said second A register into a second byte of said lower data word, a third byte of said second A register into a fourth byte of said lower data word, a first byte of said first B register into a first byte of a higher data word, a third byte of said first B register into a third byte of said higher data word, a first byte of said second B register into a second byte of said higher data word and a third byte of said second B register into a fourth byte of said higher data word.

38. The data processing system of claim 35, wherein said concatenate comprises packing a lower half word of said first A register into a lower half word of a lower data word, a higher half word of said first A register into a higher half word of said lower data word, a lower half word of said first B register into a lower half word of a higher data word and a lower half word of said second B register into a higher half word of said higher data word.

39. The data processing system of claim 35, wherein said concatenate comprises packing a lower half word of said first A register into a lower half word of a lower data word, a higher half word of said first A register into a lower half word of a higher data word, a lower half word of said first B register into a higher half word of said lower data word and a lower half word of said second B register into a higher half word of said higher data word.

* * * * *